(12) United States Patent
Chiang et al.

(10) Patent No.: US 6,948,174 B2
(45) Date of Patent: *Sep. 20, 2005

(54) IMS MFS (MESSAGE FORMAT SERVICE) METAMODEL

(75) Inventors: Chenhuei J. Chiang, San Jose, CA (US); Shyh-Mei F. Ho, Cupertino, CA (US); Elvis B. Halcrombe, San Jose, CA (US); Benjamin Johnson Sheats, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 636 days.

This patent is subject to a terminal disclaimer.

(21) Appl. No.: 09/849,105

(22) Filed: May 4, 2001

(65) Prior Publication Data

US 2004/0221292 A1 Nov. 4, 2004

Related U.S. Application Data

(60) Provisional application No. 60/223,671, filed on Aug. 8, 2000.

(51) Int. Cl.[7] .............................. G06F 3/00; G06F 9/44; G06F 9/46; G06F 13/00
(52) U.S. Cl. ....................................... 719/319; 719/313
(58) Field of Search ........................ 719/310, 313–318, 719/319, 320, 328, 329; 709/203–205

(56) References Cited

U.S. PATENT DOCUMENTS

| | | | | |
|---|---|---|---|---|
| 6,094,688 A | * | 7/2000 | Mellen-Garnett et al. | ... 719/328 |
| 6,738,975 B1 | * | 5/2004 | Yee et al. | ... 719/310 |
| 2003/0191970 A1 | * | 10/2003 | Devine et al. | ... 713/201 |

OTHER PUBLICATIONS

James Martin, "Principles of Object–Oriented Analysis and Design", Oct. 29, 1992, Chapter 1–22.
"Quarterdeck Mosaic User Guide", 1995, Chapters 1–7.

* cited by examiner

Primary Examiner—Meng-Al T. An
Assistant Examiner—Diem Ky Cao
(74) Attorney, Agent, or Firm—Sughrue Mion, PLLC

(57) ABSTRACT

A method of and a system for processing an enterpise an application request on an end user application and an application server. This is accomplished by initiating the application request on the end user application in a first language (such as a markup language) with a first application program (such as a Web browser), and transmitting the application request to the server and converting the application from the first language of the first end user application to a language running on the application server, processing the application request on the application server, and transmitting the response from the application server back to the end user application, and converting the response from the language running on the application server to the language of the end user application. The end user application and the application server have at least one connector between them, and the steps of (i) converting the application request from the language of the end user application (as a source language) to the language running on the application server (as a target language), and (ii) converting the response to the application request from the language running on the application server (as a source language) to the language of the end user application (as a target language), each include the steps of invoking connector metamodels of the respective source and target languages, populating the connector metamodels with metamodel data of each of the respective source and target languages, and converting the source language to the target language.

16 Claims, 8 Drawing Sheets

FIG. 11A

| MFSPositionType |
|---|
| row : int
column : int
physicalPage : int |

| MFSLengthType |
|---|
| length : int
firstByte : int |

| MFSPageType |
|---|
| number : int
formatting : MFSPageFormattingType |

| <<enumeration>>
MFSIntensityType |
|---|
| normal
high
nondisplayable |

| <<enumeration>>
MFSHighlightingType |
|---|
| default
blink
reversevideo
underline |

| <<enumeration>>
MFSDetectabilityType |
|---|
| deferred
immediate
nondetectable |

| <<enumeration>>
MFSValidationType |
|---|
| default
fill
field
both |

| MFSOutliningType |
|---|
| box : boolean
right : boolean
left : boolean
under : boolean
over : boolean
value : String |

| MFSFunctionKeyType |
|---|
| fieldName : String |

| MFSFunctionKeyValueType |
|---|
| index : int
function : String |

| <<enumeration>>
MFSDescriptorType |
|---|
| input
output
inout |

| <<enumeration>>
MFSPageFormattingType |
|---|
| defined
space
float |

| <<enumeration>>
MFSCompressionType |
|---|
| fixed
short
all |

| <<enumeration>>
MFSOperatorType |
|---|
| equal
notEqual
greaterThan
greaterThanOrEqual
lessThan
lessThanOrEqual |

| MFSFeatureType |
|---|
| card : boolean
dataEntryKeyboard : boolean
funtionKeys : boolean
group : int
ignore : boolean
pen : boolean |

| <<enumeration>>
MFSColorType |
|---|
| blue
red
green
pink
turquoise
yellow
default
neutral |

| <<enumeration>>
MFSJustifyType |
|---|
| left
right |

*FIG. 11B*

IMS MFS (MESSAGE FORMAT SERVICE) METAMODEL

CROSS REFERENCE TO RELATED APPLICATION

This application claims the benefit under Title 35, United States Code, Sections 111(b) and 119(e), relating to Provisional Patent Applications, of the filing date of U.S. Provisional Patent Application Ser. No. 60/223,671 filed Aug. 8, 2000 of Steven A. Brodsky and Shyh-Mei Ho for EAI Common Application Metamodel.

This application is also related to the following United States Patent Applications, filed on even date herewith:
- COMMON APPLICATION METAMODEL by Shyh-Mei Ho, Stephen Brodsky, and James Rhyne.
- COBOL METAMODEL by Shyh-Mei Ho, Nick Tindall, James Rhyne, Tony Tsai, Peter Elderon, and Shahaf Abileah.
- PL/I METAMODEL by Shyh-Mei Ho, Peter Elderon, Eugene Dong and Tony Tsai.
- HIGH LEVEL ASSEMBLER METAMODEL by Shyh-Mei Ho, John Ehrman, Benjamin Sheats, and Jenny Hung.
- TYPE DESCRIPTOR METAMODEL by Shyh-Mei Ho, James Rhyne, Peter Elderon, Nick Tindal, and Tony Tsai.
- IMS TRANSACTION MESSAGES METAMODEL by Shyh-Mei Ho and Shahaf Abileah
- CICS-BMS (BASIC MESSAGE SERVICE) METAMODEL by Shyh-Mei Ho, Andy Krasun, and Benjamin Sheats.

FIELD OF THE INVENTION

The invention relates to exchanging instructions and/or data between applications to signal readiness to transfer, exchange, or process data, or to establish at least one or more parameters for transferring data between the applications, and controlling the parameters in order to facilitate data transfer and communication. The invention further relates to integrating dissimilar applications one executing within one platform and another executing in another platform, e.g., multiple computers, multiple operating systems, multiple application components, multiple development environments, multiple deployment environments, or multiple testing and processing, establishing a dialog (e.g., a negotiation) with one another in order to establish connectivity for transferring data and/or instructions between the applications so as to facilitate performing tasks on the data or portions thereof to accomplish an overall goal. The parameters may include one or more of format, data types, data structures, or commands.

BACKGROUND

The growth of e-business has created a significant need to integrate legacy applications and bring them to the Internet. This is because the current trend for new applications is to embrace Web standards that simplify end user application construction and scalability. Moreover, as new applications are created, it is crucial to seamlessly integrate them with existing systems while facilitating the introduction of new business processes and paradigms.

Integrating new applications with existing applications is especially critical since industry analysts estimate that more than seventy percent of corporate data, including data highly relevant to e-commerce, lives on mainframe computers. Moreover, while many e-commerce transactions are initiated on Windows, Mac, and Linux end user platforms, using a variety of Web browsers, and go through Windows NT and Unix servers, they are ultimately completed on mainframe computers, running mainframe applications, and impacting data stored in mainframe databases.

There are e-business pressures to integrate server level applications and bring them to the Internet. However, there is no complete and easy mechanism to integrate or e-business enable the applications. Integration, whether through messaging, procedure calls, or database queries, is key to solving many of today's business problems.

Integrating legacy applications with new software is a difficult and expensive task due, in large part, to the need to customize each connection that ties together two disparate applications. There is no single mechanism to describe how one application may allow itself to be invoked by another.

One consequence is an e-commerce environment of multiple applications, developed by multiple development teams, running on different platforms, with different data types, data structures, commands, and command syntax's. This environment is stitched together with application program interfaces and connectors. Connectors are an essential part of the total application framework for e-commerce. Connectors match interface requirements of disparate applications and map between disparate interfaces.

This growing interconnection of old and new software systems and applications, has led to various middle ware applications and connector applications, interface specifications, interface definitions, and code, especially for the interconnection and interaction of markup languages (such as HTML, XML, Dynamic HTML, WML, and the like), through object oriented languages such as SmallTalk and C++, with languages of legacy application server applications (such as COBOL). These interface specifications, definitions, and code should apply across languages, tools, applications, operating systems, and networks so that an end user experiences the look, feel, and responses of a single, seamless application at her terminal. Instead, the proliferation of standards, protocols, specifications, definitions, and code, e.g., Common Object Request Broker (CORBA), Common Object Model (COM), Object Linking and Embedding (OLE), SOM, ORB Plus, Object Broker, Orbix, has instead created an e-commerce "Tower of Babel."

Examples of application integration are ubiquitous: from installing an ERP system, to updating an Operational Data Store (ODS) with IMS transactions or invoking CRM systems from MQSeries; each of these requires the same basic steps. First, a user must find the entity she wants to communicate with, then she must figure out how to invoke the entity, and finally she must provide translation from one native representation to another. Today, these steps usually require manual investigation and hand coding—and leave the developers with a rat's-nest of hard-to-maintain connections between applications.

Attempts to remedy this situation involve application program interfaces and connectors, which are frequently built on Interface Definition Languages. Interface Definition Languages are declarative, defining application program interfaces, and, in some cases, issues such as error handling. Most Interface Definition Languages are a subset of C++, and specify a component's attributes, the parent classes that it inherits from, the exceptions that it raises, the typed events that it emits, the methods its interface supports, input and output parameters, and data types. The goal of Interface Definition Languages within connectors is to enable collaboration between dissimilar applications without hard coded application program interfaces.

Ideally, the interface definition language, and the connector of which it is a part, should facilitate full run-time software application collaboration through such features as Method invocation with strong type checking, Run-time method invocation with greater flexibility and run time binding, High level language binding, with the interface separated from the implementation.

An interface repository containing real time information of server functions and parameters.

Additionally, the connector and its interface definition language, should be fast, efficient, scalable, portable, support metaclasses, support syntactic level extensions, and support semantic level extensions.

SUMMARY OF THE INVENTION

The problems associated with integrating new applications, for example, e-commerce applications, with legacy applications are obviated by the Common Application Metamodel tool, method, and system described herein. The Common Application Metamodel method, tool, and system of the invention facilitate tooling solutions, data translation, and communication and collaboration between dissimilar and disparate applications, as well as full run-time software application collaboration through an interface with the application server interface domain. This is accomplished through metadata interchange information, method invocation with strong type checking, run-time method invocation, run time binding, and high level language binding, with the interface separated from the implementation, and an interface repository containing real time information of client and server interface parameters.

Additionally, the tool, method, and system of the invention provide fast, efficient, and scalable interconnectivity independently of any tool or middleware, are reusable and portable, and support metaclasses, syntactic level extensions, and semantic level extensions, and are independent of any particular tool or middleware.

The Common Application Metamodel tool, method, and system is especially useful for providing a data transformer that is bi-directional between a client application and a server application, transmitting commands and data both ways between, for example, a Java, HTML, XML, C, or C++ application and a COBOL, PL/I, or High Level Assembler application, or, between an HTML or XML application and a Java, C, or C++ application, or between a Java application and a C or C++ application.

In a preferred embodiment of the invention, the metamodel is used in an transaction message management environment for processing an application request on an end user application and an application server where the server a transaction message formatter. In this embodiment an application request is initiated on the end user application in a first language with a first application program, and transmitted to the server where it is converted from the first language of the first end user application to a form for the transaction message formatter running on the application server. The application request is processed on the application server and a response is transmitted from the application server to the end user application. The response to the application request is converted from the language and form of transaction message formatter running on the application server to the first language of the first end user application. The end user application and the application server have at least one connector therebetween. In this way steps of (i) converting the application request from the first language of the first end user application as a source language to the language (including the form of the transaction message message formatter) running on the application server as a target language, and (ii) converting a response to the application request from the language (including the form of the transaction message message formatter) running on the application server as a source language to the first language of the first end user application as a target language, each comprise the steps of: invoking connector metamodels of respective source language and target transaction message formatter; populating the connector metamodels with metamodel data of each of the respective source language and target transaction message formatter, the metamodel data of the target transaction message formatter including a message descriptor, logical page, password, segment, message field, device descriptor, device type, device division, device page and device field; and converting the source language to the transaction message formatter. To be noted is that the metamodel data of the target transaction message formatter includes a message descriptor, logical page, password, segment, message field, device descriptor, device type, device division, device page and device field.

One embodiment of the invention is a method of processing a transaction on or between an end user application and one or more application servers. The method comprises the steps of initiating the transaction on the end user application in a first language with a first application program, transmitting the transaction to the server, and converting the transaction from the first language of the first end user application to a language running on the application server. Typically, as described above, the client will be a thin client or a Web browser, the application running on the client will be a Web browser application or a thin client connectivity application, and the language of the client application will be Java, C, C++, or a markup language, as HTML or a derivative of HTML, such as XML or Dynamic HTML or WML, or the like, and the language running on the server may be COBOL, PL/I, HLASM (High Level Assembler) or the like. The invention facilitates transformers which convert the transaction from the first language of the end user application to a language running on the application server. After conversion, the converted transaction is processed on the application server.

The application processes the request and then sends the response from the application server back to the end user application. Typically, as described above, the application server will be running a COBOL based application, and the client will be a thin client written in Java or C or C++, or a Web browser, running a Web browser application or a thin client connectivity application, in a markup language, as HTML or a derivative of HTML, such as XML or Dynamic HTML, or the like. The invention provides data transformers which convert the response from the language or languages running on the application server or servers to the first language of the first end user application.

The end user application and the application server have at least one data transformer between them. In this way, the steps of (i) converting the request from the first language of the first end user application as a source language to the language running on an application server as a target language, and (ii) converting the response from the language running on the application server, as a subsequent source language, back to the first language of the first end user application, as a subsequent target language, each comprise the steps of invoking type descriptor and language metamodels of respective source and target languages, populating the metamodels with each of the respective source and target languages' data items and types, and converting the source language to the target language.

The end user application is, frequently, a web browser or a thin client. When the end user application is a Web browser, the end user is connected to the application server through a web server. According to a further embodiment of the invention, the web server may comprise the connector, or data transformer. The data transformer integrated with the Web server may directly convert the request, transaction, or message from a browser oriented form to an application server language or to an intermediate, business or commerce oriented markup language, such as XML.

The CAM metamodel used to construct the converter comprises an invocation metamodel, an application domain interface metamodel, a language metamodel, and a type descriptor metamodel. Exemplary invocation metamodel includes information chosen from the group consisting of message control information, security data, transactional semantics, trace and debug information, pre-condition and post-condition resources, and user data, etc. Exemplary application domain interface metamodel comprises information chosen from input parameter signatures, output parameter signatures, and return types. Application domain interface metamodel uses one or more language metamodels, such as COBOL and PL/I metamodels.

The type descriptor metamodel defines physical realizations, storage mapping, data types, data structures, and realization constraints.

The method of the invention is applicable to situations where one of the source or target languages is object oriented, and the other of the target or source languages is not object oriented. In this situation, the language metamodel and the type descriptor metamodel together map encapsulated objects of the object oriented language into code and data of the language that is not object oriented. Additionally, the language metamodel and the type descriptor metamodel maps object inheritances of the object oriented language into references and pointers in the language that is not object oriented. The method of the invention is also applicable to situations where different object oriented languages are running on different platforms, and encapsulated objects of the source language (code and data) are mapped into encapsulated objects of the target language. The method of the invention is also applicable where different procedural languages are running on different platforms or applications and commands and data of the source procedural language are mapped into the target procedural language.

According to the method of the invention, there may be a plurality of applications for vertical (sequential, conditional, or dependent) processing, for horizontal (parallel in time) processing, or both horizontal and vertical processing. This is to support rich transactions to and through multiple hierarchical levels and multiple parallel sequences of processing. This may be the case in business to business transactions drawing upon financial, manufacturing, scheduling, supply, and shipping databases and servers, and utilizing various commercial security instruments.

A further aspect of the invention is a client-server processing system having a client, a server, and at least one transformer between the client and one or more servers, A still further aspect of the invention is a processing system configured and controlled to interact with a client application. In this aspect of the invention, the system comprises, a server, and at least one transformer between the server and the client application, where the client has an end user application, and is controlled and configured to initiate a request with the server in a first language with a first application program and to transmit the request through a transformer to the server or servers. The server processes the request in a second software application, using a second language, and returns a response to the client through a transformer.

A further aspect of the invention is a groupware system having a plurality of e-mail enabled end user applications, such as e-mail, word processing, spreadsheet, simple database management (such as Lotus Approach or Microsoft Access), graphics and graphics editing, audio and audio editing, and computer-telephony integration ("CTI"), along with client level content database client services and content replication client services. Groupware integrates these e-mail enabled applications through one or more transformers and application program interfaces with transport services, directory services, and storage services, including content servers and replication servers. The groupware system is configured and controlled to communicate among disparate end user applications, among disparate servers, and between disparate servers and end user applications. The groupware system comprises at least one transformer between a server and an end user application. The end user application is controlled and configured to participate with a server in a first language of a first application program and the server is configured and controlled to participate with the client in a second language of a second program.

The transformer is configured and controlled to receive a request from the end user application, and convert the request from the first language of the first end user application to a language running on the server. The server is configured and controlled to receive the converted request from the transformer and process the request in a second language with a second application program residing on the server, and to thereafter transmit a response through a transformer back to the end user application.

A still further embodiment of the invention is the provision of rich transaction processing. Rich transactions are nested transactions that span to, through, and/or across multiple servers. The spanning across nested servers may be horizontal, that is parallel dependent transactions, or vertical, that is, serial dependent transactions. Rich transactions may be long lived, on-going transactions, or complex business-to-business transactions, especially those with multiple dependencies or contingencies, volume and prompt payment discounts, late delivery and late payment penalties, and with financial processing, such as electronic letters of credit, electronic bills of lading, electronic payment guarantees, electronic payment, escrow, security interests in the goods, and the like. In a rich transaction environment, some transaction servers may be positioned as clients with respect to other transactions for certain sub transactions making up the rich transaction.

A still further embodiment of the invention is a tool, that is, a software developer's kit, characterized in that the program product is a storage medium (as a tape, floppy disks, a CD-ROM, or a hard drive or hard drives on one of more computers) having invocation metamodels, application domain interface metamodels, and language metamodels, and computer instructions for building a metamodel repository of source and target language metamodels. The program product also contains computer instructions for building connector stubs from the metamodels. The program product further carries computer instructions to build a transformer.

While the invention has been described in summary form as having a single level of connectors, it is, of course, to be understood that such connectors may be present at various levels in the processing hierarchy, for example between Web Clients and Web servers, between web servers and application servers, between application servers and database servers, and between application servers or database servers or both and various specialized repositories.

It is also to be understood, that while the invention has been summarized in terms of individual clients and individual servers, there may be multiple clients, multiple servers, and applications that function as both clients and servers, as exemplified by groupware applications, and there might be multiple parallel lines and/or multiple hierarchical levels of application servers, data servers, and databases, as in systems for rich transactions.

THE FIGURES

Various elements of the invention are illustrated in the FIGURES appended hereto.

Figure 5:
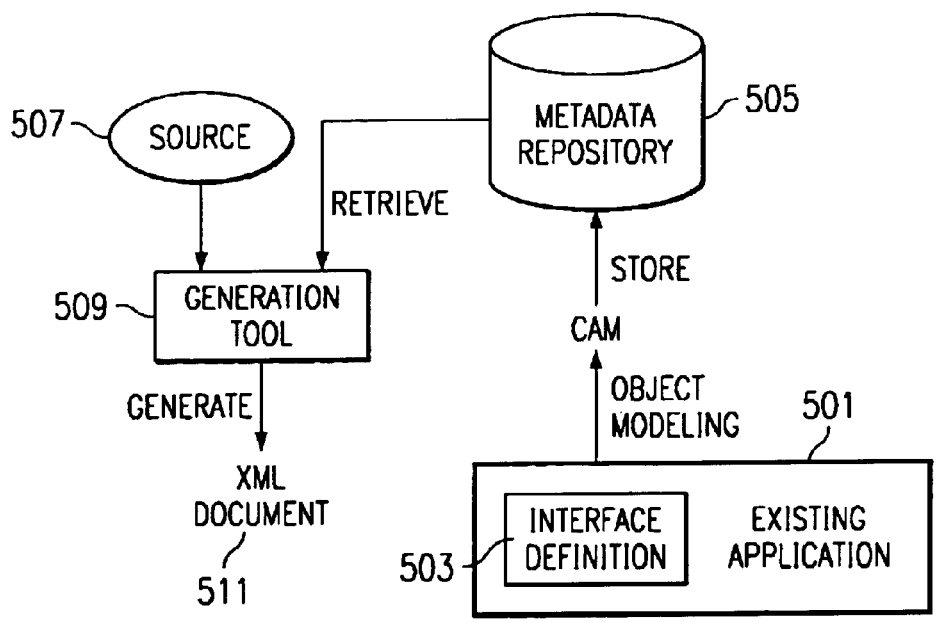

FIG. 5 illustrates how a tool can be used to generate an XML document describing application program interface. First, an object model, i.e., a CAM metamodel, is created to capture interface definitions about an application server. Then a tool reads and parses the source definitions of an application program and generates an XML document by retrieving the object model's information from a repository.

Figure 6:
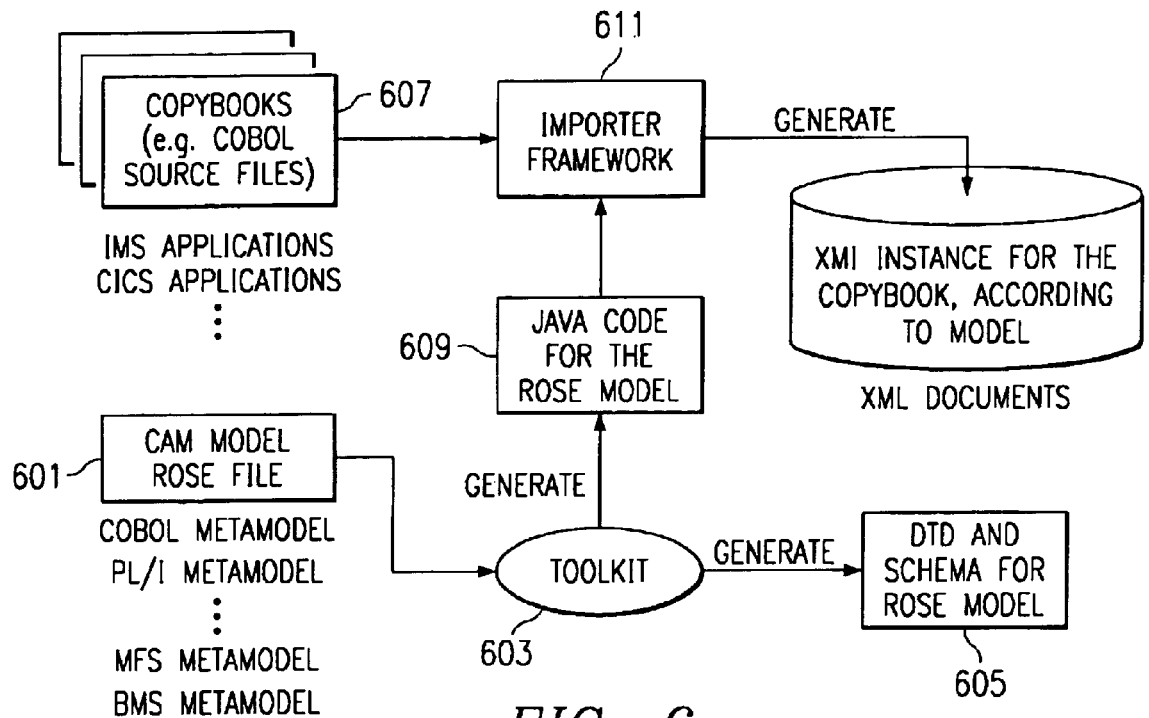

FIG. 6 illustrates a development phase scenario where a Common Application Metamodel Rose file, e.g., a COBOL metamodel, a PL/I metamodel, an MFS metamodel, a BMS model, or the like is read into a toolkit, to generate a DTD and XML schema and Java code for a Rose model. A source file of an application, as a COBOL source file, a PL/I source file, an MFS source file, a BMS source file, or the like, is read into an importer. The importer parses the source code and generates, as output, an XMI instance file, i.e., XML documents, by reading in the Java code of the Rose model of the application source files.

Figure 7:
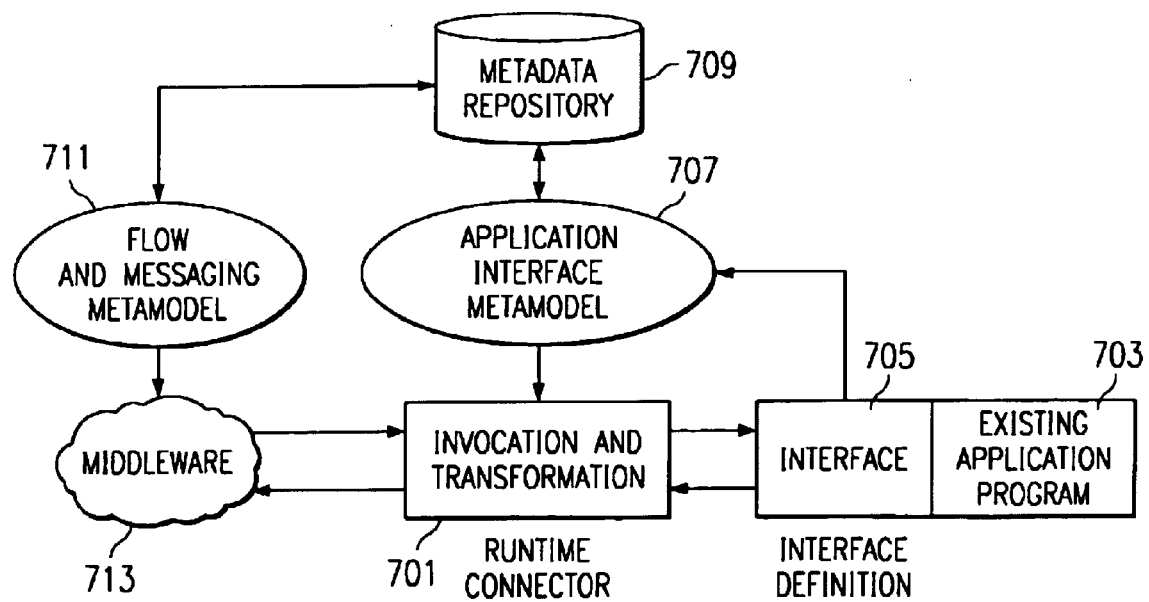

FIG. 7 illustrates a metamodel for application interfaces, which enables integration of application components into an event based messaging model, including flow models. The flow and messaging middle invokes applications through the application interface. These interfaces are access points to the applications through which all input and output is connected to the middleware. The interfaces are described in terms of the Application Interface Metamodels. Transformation processing according to he metamodel could take place in source/client applications, target applications, or a gateway.

Figure 8:
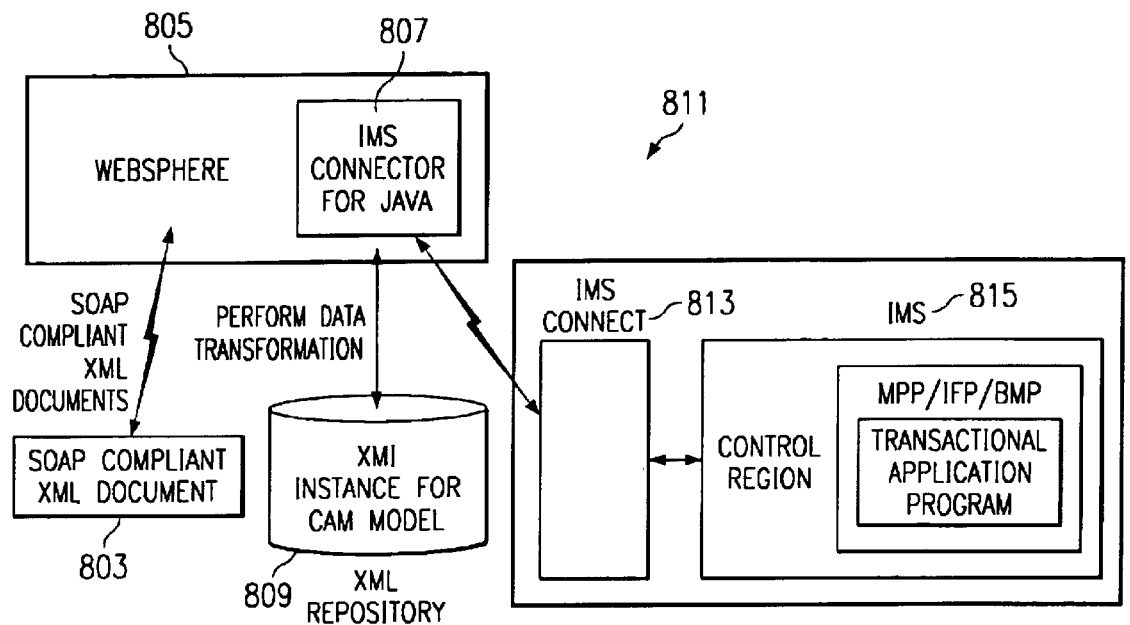

FIG. 8 illustrates the application of the Common Application Metamodel during execution time. As shown, the CAM model facilitates connectivity between a back-end IMS application and a Web file (e.g., SOAP complaint XML documents). This is accomplished by using information captured in the model to perform data transformations from one platform to another in a mixed language environment shown.

Figure 9:
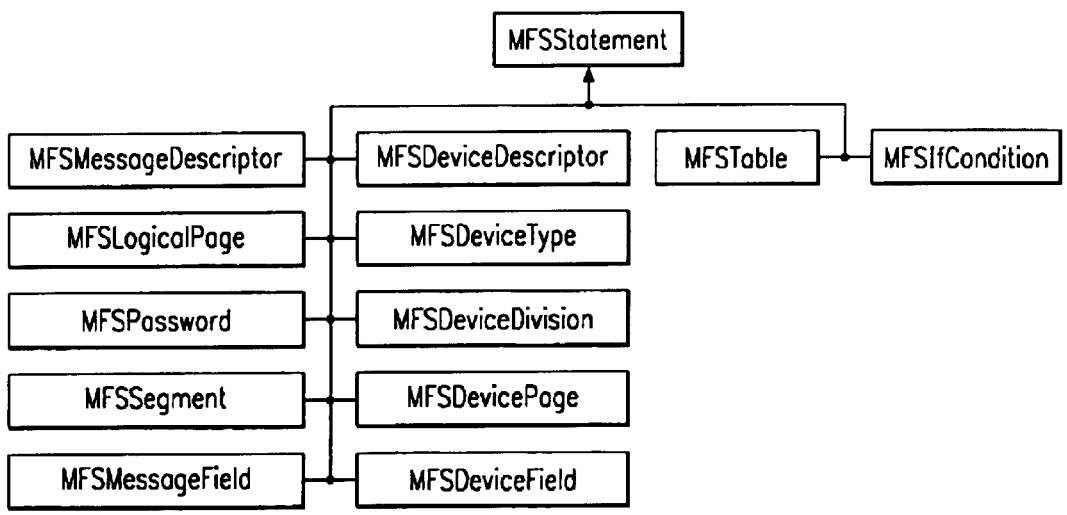

FIG. 9 illustrates a MFS language metamodel, which is usable by application programs to define data structures which represent connector interfaces.

Figure 10:
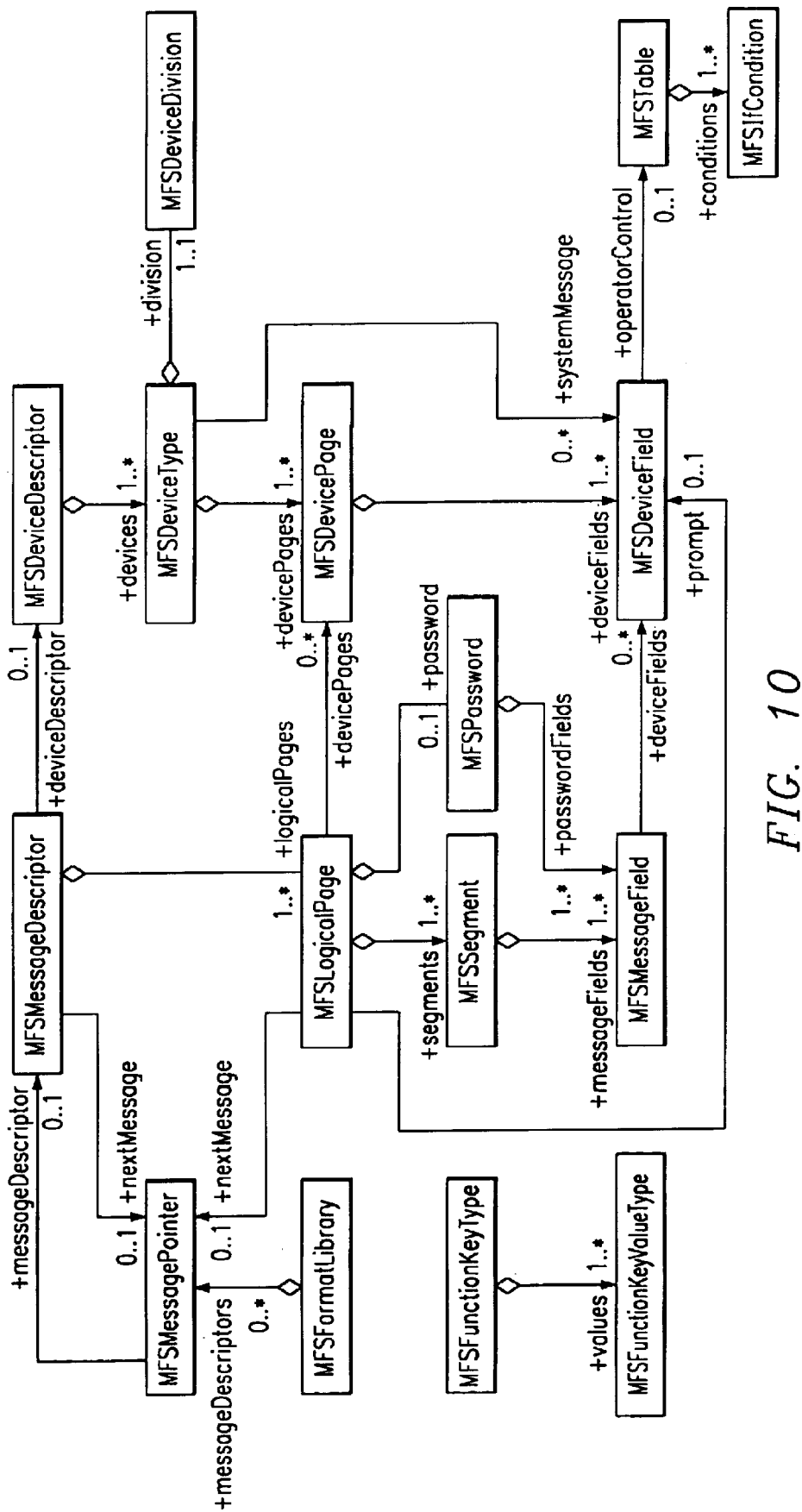

FIG. 10 illustrates the associations between the classes of the MFS metamodel.

Figure 11A:
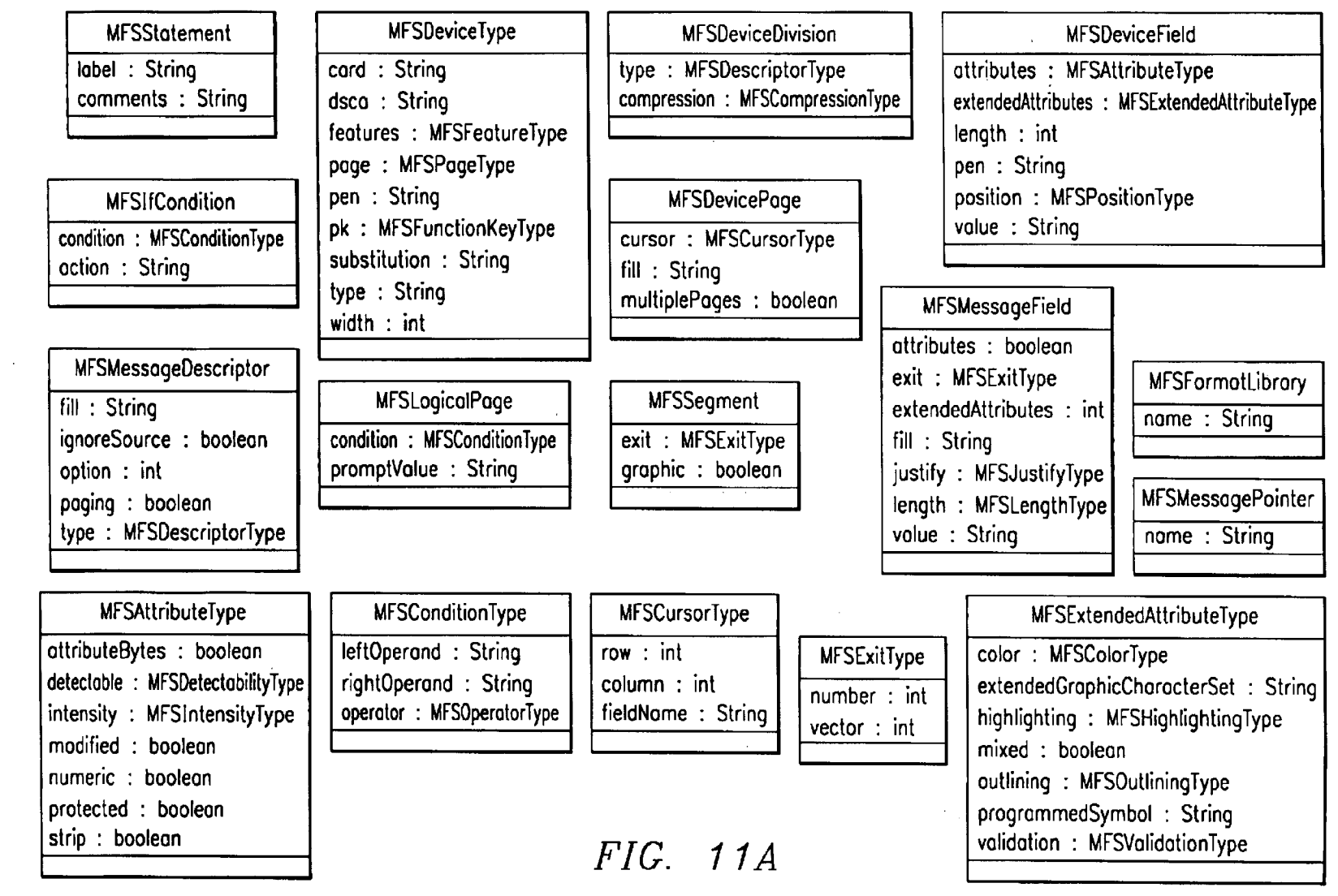

FIG. 11 illustrates enumerations of Mode Values, Base Values, LengthTypes, and StringTypeValues for the MFS Metamodel.

DETAILED DESCRIPTION OF THE INVENTION

Definitions. As used herein the following terms have the indicated meanings. "Handshaking" is the exchange of information between two applications and the resulting agreement about which languages, capabilities, and protocols to use that precedes each connection.

An "application program interface" (API) is a passive specific method prescribed by a computer operating system or by another application program by which a programmer writing an application program can make requests of the operating system or another application. Exemplary is SAX (Simple API for XML), an connector that allows a programmer to interpret a Web file that uses the Extensible Markup Language, that is, a Web file that describes a collection of data. SAX is an event-driven interface. The programmer specifies an event that may happen and, if it does, SAX gets control and handles the situation. SAX works directly with an XML parser.

A "connector" as used herein is a dynamic, run-time, interface between platforms that stores the functions and parameters of the target platform or program, and binds with the target platform program in real time.

A "stub" is a small program routine that provides static interfaces to servers. Precompiled stubs define how clients invoke corresponding services on the server. The stub substitutes for a longer program on the server, and acts as a local call or a local proxy for the server object. The stub accepts the request and then forwards it (through another program) to the remote procedure. When that procedure has completed its service, it returns the results or other status to the stub which passes it back to the program that made the request. Server services are defined in the stub using an Interface Definition Language ("IDL"). The client has an IDL stub for each server interface that it accesses and includes code to perform marshaling. Server stubs provide static interfaces to each service exported by the server.

"CICS" (Customer Information Control System) is the online transaction processing program from IBM that, together with the Common Business Oriented Language programming language, is a set of tools for building customer transaction applications in the world of large enterprise mainframe computing. Using the programming interface provided by CICS to write to customer and other records (orders, inventory figures, customer data, and so forth) in a CICS, a programmer can write programs that communicate with online users and read from a database (usually referred to as "data sets") using CICS facilities rather than IBM's access methods directly. CICS ensures that transactions are completed and, if not, it can undo partly completed transactions so that the integrity of data records is maintained. CICS products are provided for OS/390, UNIX, and Intel PC operating systems. CICS also allows end users to use IBM's Transaction Server to handle e-business transactions from Internet users and forward these to a mainframe server that accesses an existing CICS order and inventory database.

"IMS" (Information Management System) is the system from IBM that, together with IBM's Enterprise Systems Architecture (IMS/ESA) provides a transaction manager and a hierarchical database server.

"MQ" is the MQSeries IBM software family whose components are used to tie together other software applications so that they can work together. This type of application is often known as business integration software or middleware. Functionally, MQSeries provides a communication mechanism between applications on different platforms, an integrator which centralizes and applies business operations rules, and a workflow manager which enables the capture, visualization, and automation of business processes. MQSeries connects different computer systems, at diverse geographical locations, using dissimilar IT infrastructures, so that a seamless operation can be run. IBM's MQSeries supplies communications between applications, and between users and a set of applications on dissimilar systems. Additionally, MQSeries' messaging scheme requires the application that receives a message to confirm receipt. If no confirmation materializes, the message is resent by the MQSeries.

"Rose" is an object-oriented Unified Modeling Language (UML) software design tool intended for visual modeling and component construction of enterprise-level software applications. It enables a software designer to visually create (model) the framework for an application by blocking out classes with actors (stick figures), use case elements (ovals), objects (rectangles) and messages/relationships (arrows) in a sequence diagram using drag-and-drop symbols. Rose documents the diagram as it is being constructed and then generates code in the designer's choice of C++, Visual Basic, Java, Oracle8, Corba or Data Definition Language.

Figure 1:
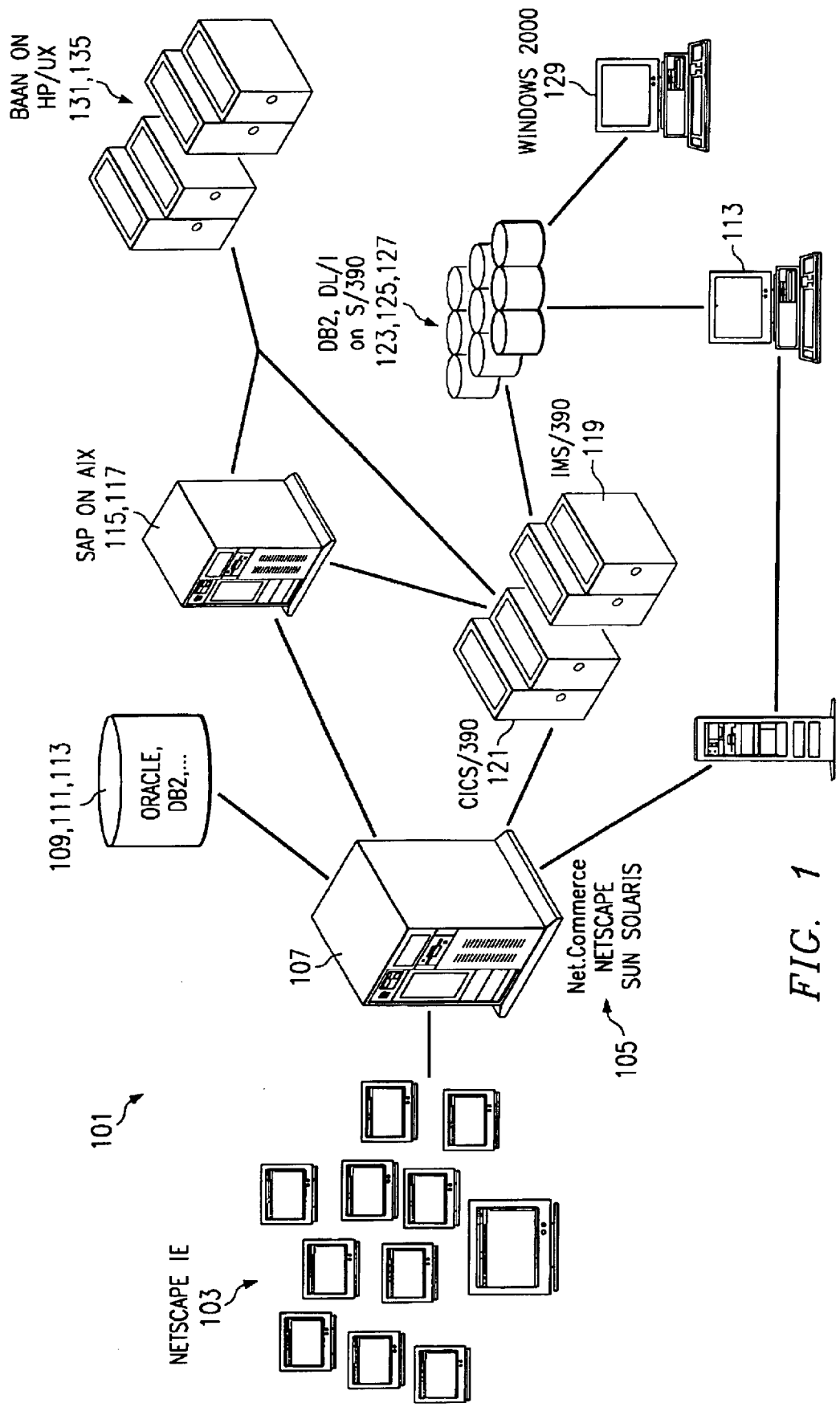
FIG. 1 illustrates a system with multiple application components, including a Netscape Internet Explorer browser, Net.Commerce on a Sun Solaris server, Oracle and DB2 on a database server, SAP running on AIX, a CICS 390 server, an IMS 390 server, DB2 and DL/I on a S/390 platform, a Windows 200 client, and Baan running on an HP Unix server.
Figure 2:
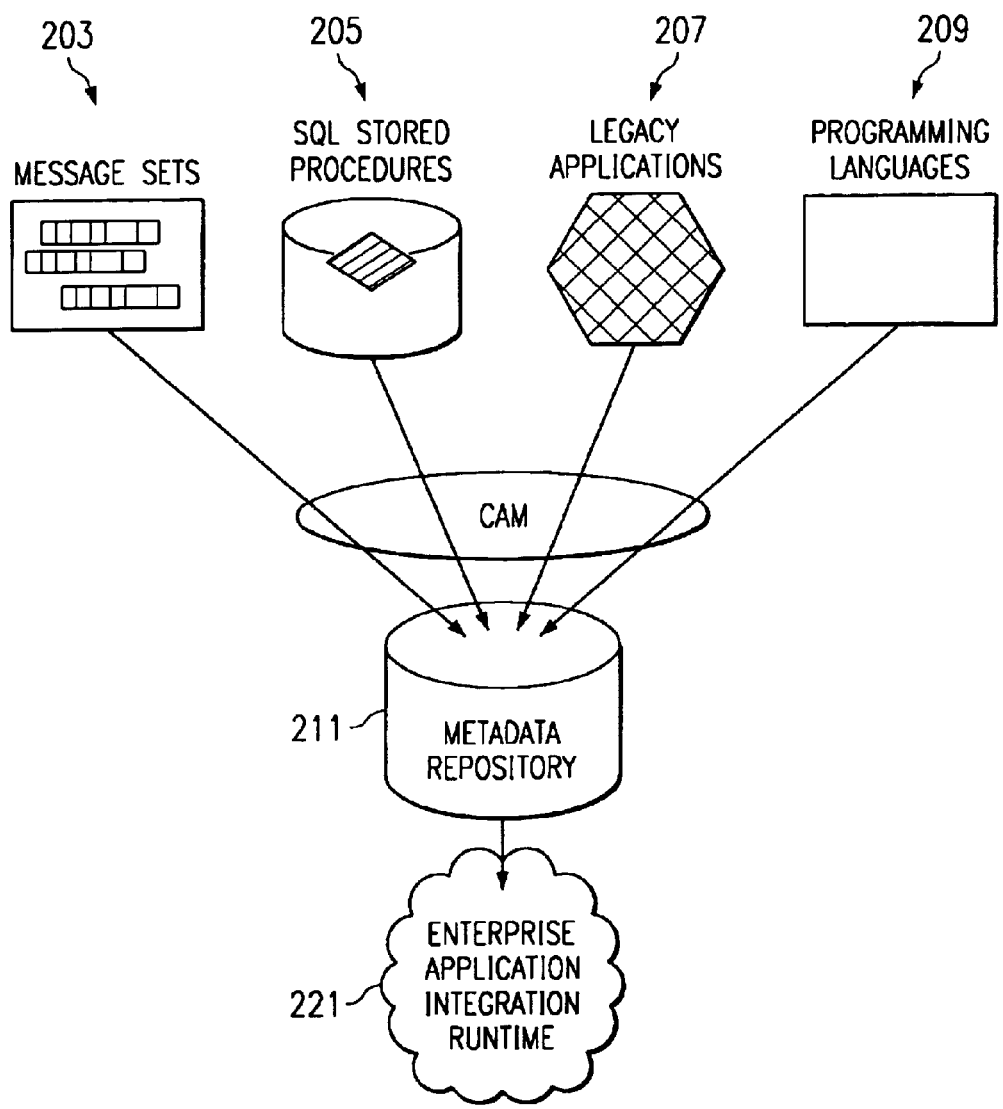
FIG. 2 illustrates the roles of message sets, SQL stored procedures, legacy applications, and programming languages as inputs to the metadata repository of the Common Application Metamodel to facilitate enterprise application integration at run time.

Common Application Metamodel Overview. The Common Application Metamodel (CAM) brings interconnectivity to the environment illustrated in FIG. 1. FIG. 1 illustrates a typical system 101 with multiple application components, including a Netscape Internet Explorer browser 103, Net.Commerce 105 on a Sun Solaris server 107, Oracle 109 and DB2 111 on a database server 113, SAP 115 running on AIX 117, a CICS 390 server 119, an IMS 390 server 121, DB2 123 and DL/I 125 on a S/390 platform 127, a Windows 2000 client 129, and Baan 131 running on an HP Unix server 133. The Common Application Metamodel (CAM) is metadata interchange method, tool, and system for marshaling and applying information needed for accessing enterprise applications, such as in FIG. 1, in a source language and converting them to a target language. CAM consists of language metamodels and application domain interface metamodels, as shown in FIG. 2, which illustrates the roles of message sets 203, SQL stored procedures 205, legacy applications 207, and programming languages 209 as inputs to the metadata repository 211 of the Common Application Metamodel to facilitate enterprise application integration 221.

Figure 3:
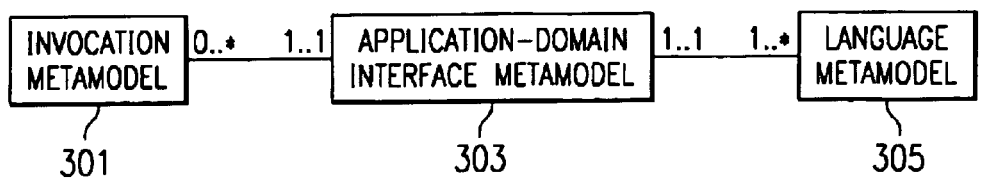
FIG. 3 illustrates that the Common Application Metamodel of the invention consists of three kinds of metamodels, i.e., an invocation metamodel, an application-domain interface metamodel, and a language metamodel. For any given application-domain metamodel it may use one or many language metamodels, and there could be zero or many invocation metamodels.

Exemplary metamodels include C, C++, Java, COBOL, PL/I, HL Assembler, IMS transaction messages, IMS MFS, CICS BMS, and MQSeries messages models, as shown in FIG. 3, which illustrates the Common Application Metamodel of the invention, with an invocation metamodel 301, an application-domain interface metamodel 303, and a language metamodel 305.

Figure 4:
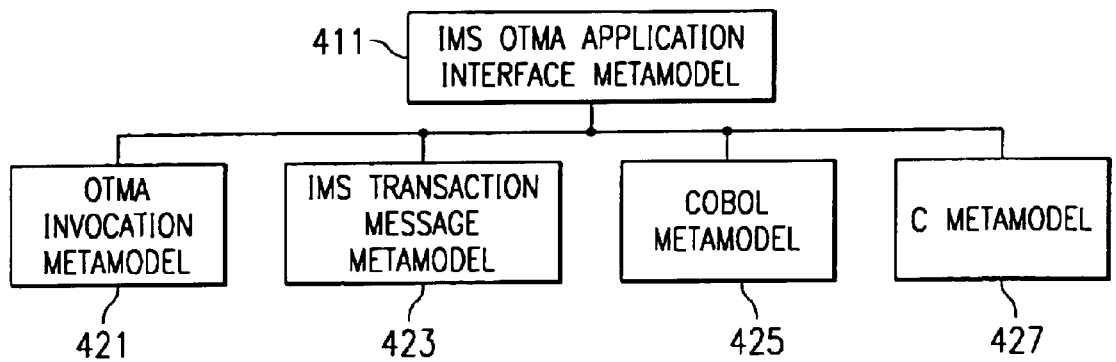
FIG. 4 illustrates an IMS OTMA metamodel, with an OTMA Invocation Metamodel, an IMS Transaction Message Metamodel application interface, which could use a COBOL Metamodel, a C Metamodel, or other language metamodels.

FIG. 4 illustrates an IMS OTMA application interface metamodel 411, with an OTMA Invocation Metamodel 421, an IMS Transaction Message Metamodel 423, a COBOL Metamodel 425, and a C Metamodel 427.

FIG. 5 illustrates the flow of information from an existing application 501, through an interface 503 to an object model containing application interface metadata. This application interface metamodel is stored in the metadata repository 505, and, at an appropriate time, retrieved from the metadata repository 505, combined with a source program 507 in a generation tool 509, and used to generate a target file 511, as an XML file, i.e., an XMI instance file. CAM is highly reusable and independent of any particular tool or middleware.

Development Stage. With CAM, tooling can now easily provide solutions to access enterprise applications, e.g. IMS applications. By parsing each source file and generating XML documents based on the CAM model, COBOL copybook, PL/I copybook, MFS Source, BMS Source, etc., tools can provide connector solutions to IMS, and CICS, etc.

In this regard, FIG. 6 illustrates a development phase scenario where a Common Application Metamodel Rose file 601, e.g., a COBOL metamodel, a PL/I metamodel, an MFS metamodel, a BMS model, or the like is read into a toolkit 603, to generate a DTD and schema for a Rose model and Java code for a Rose model 605. A source file of an application 607, as a COBOL source file, a PL/I source file, an MFS source file, a BMS source file, or the like, and the Java code for the Rose model 609 are read into an Importer 611. The importer parses the source code and provides, as output, an XMI instance file 613, i.e., XML documents, of the application source files.

FIG. 7 shows a CAM metamodel for application interfaces. This Figure depicts a runtime connector 701 with invocation and transformation capabilities, interfacing with an existing application program 703 through an interface 705 containing the existing application program's interface definition, in accordance with the application interface metamodel 707. The Application Interface metadata is stored in a metadata repository 709.

The flow and messaging middleware 713 invokes applications 703 through the application interfaces 705. These interfaces 705 are the access points to the applications 703 through which all input and output is connected to the middleware 713. The interfaces 705 are described in terms of the Application Interface Metamodel. Transformation processing according to the metamodel could take place in source/client applications, target applications, or a gateway.

Because CAM also provides physical representation of data types and storage mapping to support data transformation in an enterprise application integration environment, it enables Web services for enterprise applications.

At development time CAM captures information that facilitates:

a). connector and/or connector-builder tools, b). data driven impact analysis for application productivity and quality assurance, and c). viewing of programming language data declarations by developers.

The CAM metamodel files are inputs to toolkits used to generate DTD files, XML schemas, and Java classes which represent the CAM model. Importers parse each source file (e.g. COBOL or PL/I copybook, MFS source, and BMS, etc.), and then generate XML documents (i.e. XML instance files) based on Java classes generated by the XMI/MOF2 toolkit.

Run Time. At run time CAM provides information which facilitates transformation in an enterprise application integration environment where it provides data type mapping between mixed languages, facilitates data translations from one language and platform domain into another.

FIG. 8 illustrates the application of the Common Application Metamodel during run time. As shown, SOAP compliant XML documents 803 are received in, for example, IBM WebSphere middleware, 805, which contains an IMSConnector for Java 807, and is in contact with an XML Repository 809, containing the XMI instance files for the CAM model. The IBM WebSphere middleware sends the transformed file to the IMS system 811, which contains an instance of IMS Connect 813 and the IMS transactional application program 815. CAM facilitates connectivity between the back-end IMS application 815 and the Web file (e.g., SOAP compliant XML documents) 803. The CAM accomplishes this by using CAM model information (from repository 809) to perform data transformations from one platform to another in the mixed language environment shown.

Type Descriptor Metamodel. One important feature provided by CAM is the Type Descriptor metamodel. The Type Descriptor metamodel defines the physical realization, storage mapping, and the constraints on the realization (such as justification). This metamodel provides a physical representation of individual fields of a given data structure. When supporting data transformation in an enterprise application integration environment, the model provides data type mapping between mixed languages. It also facilitates data translations from one language and platform domain into another. The metamodel is used for runtime data transformation (or marshaling) with a language-specific metamodel for overall data structures and field names.

1. Common Application Metamodel for Application Interfaces

The interconnection of disparate and dissimilar applications running on different software platforms, as shown in FIG. 1, with different operating systems, physical platforms, and physical realizations is accomplished through connectors that incorporate the interconnection metadata. Connectors are a central part of the application framework for e-business. The end user demand is to connect to anything interesting as quickly, and as easily, as possible.

A connector is required to match the interface requirements of the adapter and the legacy application. It is also required to map between the two interfaces. Standardized metamodels for application interfaces presented herein allow reuse of information in multiple connector tools. These standardized metamodels not only reduce work to create a connector, but also reduce work needed to develop connector builder tools.

The connectors built using the common application metamodel of our invention provide interoperability with existing applications. The connectors support leveraging and reuse of data and business logic held within existing application systems. The job of a connector is to connect from one application system server "interface" to another. Therefore, an application-domain interface metamodel describes signatures for input and output parameters and return types for a given application system domain (e.g. IMS, MQSeries); it is not for a particular IMS or MQSeries application program. The metamodel contains both syntactic and semantic interface metadata.

1. a. End-to-End Connector Usage Using Common Application Metamodel

The Common Application Metamodel (CAM) consists of meta-definitions of message signatures, independent of any particular tool or middleware. Different connector builder tools can use this information to ensure the "handshaking" between these application programs, across different tools, languages, and middleware. For example, if you have to invoke a MQSeries application, you would need to build a MQ message using data from a GUI tool and deliver it using the MQ API. Similarly, when you receive a message from the MQSeries application, you would need to get the buffer from MQSeries, parse it and then put it into a GUI tool data structure. These functions can be designed and implemented efficiently by a connector builder tool using CAM as standardized metamodels for application interfaces.

CAM can be populated from many sources, including copy books, to generate HTML forms and JavaServer Page (JSP) for gathering inputs and returning outputs. An example of a connector as depicted in the previous figure is that the flow and message middleware makes a function call to an enterprise application by calling the connector which then calls the enterprise application API. The connector does language and data type mappings, for example, to translate between XML documents and COBOL input and output data structures based on CAM. Connectors and CAM provide the end-to-end integration between the middleware and the enterprise applications.

Using IMS as an example. Let's say that you must pass an account number to an IMS transaction application program from your desktop to withdraw $50.00. With CAM and a connector builder tool, you will first generate an input HTML form and an output JSP; and develop a middleware code necessary to support the request. The desktop application fills the request data structure (i.e. an input HTML form) with values and calls the middleware. The middleware service code will take the data from the GUI tool, build an IMS Connect XML-formatted message, and deliver the message to the IMS gateway (i.e. IMS Connect) via TCP/IP. IMS Connect translates between the XML documents and the IMS message data structures in COBOL using the metadata definitions captured in CAM. It then in turn sends the IMS message data structures to IMS via Open Transaction Manager Access (OTMA). The IMS COBOL application program runs, and returns the output message back to the middleware service code via IMS Connect. The middleware service code gets the message and populates the output JSP page (i.e. previously generated GUI tool reply data structures) with the reply data. The transaction output data will then be presented to the user.

2. Common Application Metamodel

CAM is used to describe information needed to easily integrate applications developed in common programming models with other systems. The CAM metamodel can be used for both synchronous and asynchronous invocations.

2. a. Common Application Metamodel

The common application metamodel depicted as follows consists of an invocation metamodel and an application-domain interface metamodel which uses language metamodels. For any given application-domain interface metamodel, it may use one or many language metamodels, but, there could be zero or more invocation metamodels.

The common connector metamodel is illustrated in FIG. 3. It has an Invocation Metamodel 301, an Application-Domain Interface Metamodel 303, and a Language Metamodel 305.

2. a. i. Invocation Metamodel

The invocation metamodel 301 consists of one or more of the following possible metadata elements. However, for a particular invocation, it could include only one or many of the following metadata elements.

Message-control information. This includes message control information, such as the message connection name, message type, sequence numbers (if any), and various flags and indicators for response, commit-confirmation, and processing options by which a client or server can control message processing to be synchronous or asynchronous, etc.

The connection name can be used by the application system server to associate all input and output with a particular client. The message type specifies that the message is a response message; or that commit is complete. It can also indicate server output data to the client, or client input data to the server.

Security data—This includes authentication mechanism, and security data, e.g. digital certificates, identity, user name and password, etc. It may also include authorization information to indicate whether the data can be authorized via a role based or ACL (access control list) based authorization.

Transactional semantics—This will carry transaction information, e.g. local vs. global transaction; two-phase commit vs. one-phase commit, and transaction context, etc.

Trace and debug—Trace and debugging information are specified as part of the metamodel.

Precondition and post-condition resource—This describes application state precondition and post-condition relationships.

User data—This includes any special information required by the client. It can contain any data.

2. a. ii. Application-Domain Interface Metamodel

The application-domain interface metamodel 303, as discussed earlier, describes signatures for input and output parameters and return types for application system domains.

2. a, iii. Language Metamodel

The language metamodel 305, e.g. COBOL metamodel, is used by enterprise application programs to define data structures (semantics) which represent connector interfaces. It is important to connector tools to show a connector developer the source language, the target language, and the mapping between the two. The CAM language metamodel also includes the declaration text in the model which is not editable (i.e. read-only model). Because the connector/adapter developer would probably prefer to see the entire COBOL data declaration, including comments and any other documentation that would help him/her understand the business role played by each field in the declaration.

The language metamodel is also to support data driven impact analysis for application productivity and quality assurance. (But, it is not the intention of the CAM to support reproduction of copybooks.)

The language metamodels describing connector data are listed as follows:
C
C++
COBOL
PL/I 2. a. iv. Type Descriptor Metamodel The Type Descriptor metamodel is language neutral and defines the physical realization, storage mapping and the constraints on the realization such as justification. This metamodel provides physical representation of individual fields of a given data structure. The type descriptor metamodel is to support data transformation in an enterprise application integration environment to provide data types mapping between mix languages. It also facilitates data translations from one language and platform domain into another. This metamodel will be used as a recipe for runtime data transformation (or marshaling) with language specific metamodel for overall data structures and fields names.

3. An Example of Common Connector Metamodel

IMS OTMA (Open Transaction Manager Access) is a transaction-based, connectionless client/server protocol within an OS/390 sysplex environment. An IMS OTMA transaction message consists of an OTMA prefix, plus message segments for input and output requests. Both input and output message segments contain llzz (i.e. length of the segment and reserved field), and application data. Only the very first input message segment will contain transaction code in front of the application data. IMS transaction application programs can be written in a variety of languages, e.g. COBOL, PL/I, C, and Java, etc. Therefore, the application data can be in any one of these languages.

As shown in FIG. 4, an IMS OTMA connector metamodel 401 is composed of an invocation metamodel 403 and an IMS transaction message metamodel 405, as well as a COBOL metamodel 407 and a C metamodel 409. As depicted in FIG. 4, the invocation metamodel 401 is the OTMA prefix, and the IMS transaction message metamodel 405 is the application-domain interface metamodel for the IMS application system which uses language metamodels. Metamodels for COBOL 407 and C 409 are shown.

4. Type Descriptor Metamodel

The type descriptor metamodel presents a language and platform independent way of describing implementation types, including arrays and structured types. This information is needed for marshaling and for connectors, which have to transform data from one language and platform domain into another. Inspections of the type model for different languages can determine the conformance possibilities for the language types. For example, a long type in Java is often identical to a binary type (computational-5) in COBOL, and if so, the types may be inter-converted without side effect. On the other hand, an alphanumeric type in COBOL is fixed in size and if mapped to a Java type, loses this property. When converted back from Java to COBOL, the COBOL truncation rules may not apply, resulting in computation anomalies. In addition, tools that mix languages in a server environment (e.g., Java and COBOL in CICS and IMS) should find it useful as a way to determine how faithfully one language can represent the types of another.

Therefore, an instance of the type descriptor metamodel describes the physical representation of a specific data type for a particular platform and compiler.

4. a. TDLang Metamodel

The TDLang metamodel serves as base classes to CAM language metamodels by providing a layer of abstraction between the Type Descriptor metamodel and any CAM language metamodel. All TDLang classes are abstract and common to all the CAM language metamodels. All associations between TDLang classes are marked as "volatile," "transient," or "derived" to reflect that the association is derived from the language metamodel. The TDLang model does not provide any function on its own, but it is the type target for the association from the Type Descriptor metamodel to the language metamodels.

FIG. 9 illustrates the structure of the TDLang Metamodel, with the TDLangClassifier 501, the TDLangComposedType 503 and the TDLangElement 505.

With the TDLang base classes, the Type Descriptor metamodel can be used as a recipe for runtime data transformation (or marshaling) with the language-specific metamodel for overall data structures and field names, without duplicating the aggregation associations present in the language model.

4. b. Type Descriptor Metamodel

This metamodel is a MOF Class instance at the M2 level. FIG. 10 shows the relationships within the type descriptor Metamodel, including the PlatformCompilerType 601, the InstanceTDBase 603, the ArrayTD 605, the AggregateInstanceTD 607, the Simple InstanceTD 609, and the InstanceType 611. The InstanceType 611 comprises definitions of the StringTD 613, the AddressTD 615, the NumberTD 617, and the FloatTD 619. FIG. 11 illustrates a higher level view of the TDLanguageElement and the PlatformCompilerType 601. FIG. 12 illustrates enumerations of signCoding 801, lengthEncoding 803, floatType 805, accessor 807, packedDecimalSign 809, and bitModePad 811.

4. c. Type Descriptor and Language models

The Type Descriptor model is attached to the CAM Language model by a navigable association between TDLangElement and InstanceTDBase. TDLangElement is the base language model type used to represent a declared data item, i.e., an instance of a type. InstanceTDBase is the base Type Descriptor model type used to represent the implementation-specific instance of this same declared data item. InstanceTDBase is abstract; only one of its subtypes may be instantiated.

It is possible that a data item declared in a programming language may have different implementations. These differences are induced by hardware platform, system platform, and compiler differences. This possibility is modeled by the PlatformCompilerType model type. The association between TDLangElement and PlatformCompilerType is many to one, and the association between PlatformCompilerType and InstanceTDBase is one to one. To navigate from the language model, it is necessary to know what PlatformCompilerType is to be assumed. It is possible that an implementation, upon importing a model instance, will wish to remove from the model the PlatformCompilerType instances that are not of interest.

The association between TDLangElement and InstanceTDBase is modeled in this manner to allow for extending the model to include an association between PlatformCompilerType and a new type that more fully describes the hardware platform, the system platform, and the compiler.

Data element instances may be defined as repeating groups or arrays. This is modeled as a one to many association between InstanceTDBase and the ArrayTD model type. There would be one ArrayTD instance in this association for each dimension, subscript, or independent index of the data element. These instances hold information about the bounds and accessing computations.

The association is ordered in the same order as the corresponding association in the language model, and reflects the syntactic ordering of the indices as defined by the programming language. The rationale for this choice is the resulting equivalence of navigation and processing algorithms between the language model and the Type Descriptor model. Another choice, perhaps more advantageous to marshaling engines, would be to have the ordering of the indices from the smallest stride to the largest. This allows a marshaling engine to process the array in its natural storage order, assuming it is laid out in the usual contiguous fashion. A marshaling engine can compute this order by re-sorting the association targets according to the stride formulas if desired.

Array information may be a complex property of the data element or of its type, and various languages and programming practices seem to fall on either side. The typedef facility of C and C++ allows the definition of some array types from typedefs, but only where the array definitions are applied to the topmost elements of typedef aggregates. For example, consider the following typedef:

```
typedef struct {
    int A;
    struct {
        int C;
        char D;
        struct {
            int F;
            int G;
        } E;
    } B;
} X;
```

This typedef can be used to create a new typedef for a fixed size array, e.g. typedef X Q[10];

But it is not possible to create a new typedef from X that makes any of the subcomponents of X, e.g., D or E, into an array. This example and many others point out the unclear status of array definitions in typed languages.

An InstanceTDBase type has two concrete subtypes, SimpleInstanceTD and AggregateInstanceTD. SimpleInstanceTD models data elements without subcomponents, while AggregateInstanceTD models data elements with subcomponents. To find the subcomponents of an AggregateInstanceTD, one must navigate back to the corresponding data element declaration in the CAM language model. There, the association between an aggregate type and its subcomponents may be navigated, leading to a set of subcomponent data elements, each of which has one or more corresponding instances in the Type Descriptor model. This introduces some model navigation complexity, but avoids duplicating the aggregation hierarchy in both the language and the Type Descriptor models. The additional processing complexity of traversal is not great, and considerable simplification is obtained in algorithms that would modify the model to add, delete or rearrange subcomponents in an aggregation.

A SimpleInstanceTD model type is also associated one to one with a BaseTD model type. The BaseTD model type is specialized to hold implementation information that is common for all data elements of the same language type. The information that describes a 32-bit signed binary integer on a specific hardware/software platform is thus instantiated only once in a given model instantiation, no matter how many data elements may be declared with this type.

One may contemplate an association between TDLangClassifier and BaseTD matching the association between TDLangElement and InstanceTDBase. However, this is problematic in that constructions that the language regards as simple types (e.g., strings) may not map directly to simple hardware/software types. Rather than introduce more mechanisms into the Type Descriptor model to describe string implementations, a specialization of BaseTD is utilized which describes the common string implementations.

Various attributes in the TypeDescriptor model are suffixed with the string "formula." These attributes contain information that may in some cases be impossible to compute without access to data created only at run-time. An example is the current upper bound of a variable-sized array or the offset to an element that follows another element whose size is only known at run-time. Such information could be included as values in a model instance, but this would require a model instance for each run-time instance, and would mean that the model could only be constructed at run-time, requiring the model definition to include factories and other apparatus to create model instances at run-time. A model that can be constructed from platform and compiler knowledge is much more useful, and the formulas provide a way to define concrete values when the run-time information is available. These formulas may be interpreted by marshaling engines, or they may be used to generate marshaling code, which is loaded and executed by the marshaling engine on demand.

5. Application-Domain Interface Metamodel IMS MFS (Messaging Formatting Service)

FIG. 9 illustrates a MFS language metamodel, which is usable by application programs to define data structures which represent connector interfaces. FIG. 10 illustrates the associations between the MFS metamodel with the TDLang base classes which are the TDLangClassifier, the TDLanguageComposedType, and the TDLanguageElement for the MFS Metamodel. FIG. 32 illustrates enumerations of Mode Values, Base Values, LengthTypes, and StringType-Values for the MFS Metamodel.

Package Documentation for MFS

The following device types are supported:
  3270 and 3270-An
  3270P

The following device types are not supported:
  2740 or 2741
  3600 or 4700
  FIN
  FIDS, FIDS3, FIDS4 or FIDS7
  FIJP, FIPB or FIFP
  SCS1
  SCS2
  DPM-An
  DPM-Bn Statements implicitly supported through parser:
  ALPHA
  COPY
  DO
  END
  ENDDO
  EQU
  FMTEND
  MSGEND
  RESCAN
  TABLEEND Tolerated statements:
  EJECT
  PD
  PDB
  PDBEND
  PPAGE
  PRINT
  RCD
  SPACE
  STACK
  TITLE
  UNSTACK MFSDeviceType
  DEV statement
    The DEV statement defines device characteristics for a specific device or data formats for a specific device type. The DFLD statements following this DEV statement are mapped using the characteristics specified until the next DEV or FMTEND statement is encountered.
  Unsupported attributes:
    ERASE
    FTAB
    FORMS
    HT
    HTAB
    LDEL
    MODE
    SLD
    VERSID
    VT
    VTAB
  Derived from MFSStatement
  Private Attributes:
  card: String
    CARD attribute
    Defines the input field name to receive operator identification card data when that data is entered. This name can be referenced by an MFLD statement and must not be used as the label of a DFLD statement within this DEV definition. This operand is valid only if a 3270 display is specified. If FEAT=NOCD is specified for a 3270 display, it is changed to CARD. All control characters are removed from magnetic card input before the data is presented to the input MFLD that refers to this card field name.
    For 3270 displays, an unprotected field large enough to contain the magnetic card data and control characters must be defined through a DFLD statement. Position the cursor to this field and insert the card in the reader to enter card information. The card data is logically associated with the CARD= field name, not the name used in the DFLD statement.
  dsca: String
    DSCA attribute
    Specifies a default system control area (DSCA) for output messages using this device format. The DSCA supersedes any SCA specified in a message output descriptor if there are conflicting specifications. Normally, the functions specified in both SCAs are performed. If the DSCA= operand is specified for 3270P, it is ignored, except for the bit setting for "sound device alarm." If this bit is specified on the DSCA/SCA option, it is sent to the device.
    The value specified here must be a decimal number not exceeding 65535 or X'hhhh'. If the number is specified, the number is internally converted to X'hhhh'.
    If byte 1 bit 5 is set to B'1' (unprotect screen option) for a 3275 display, and both input and output occur simultaneously (contention), the device is disconnected. For non-3275 devices, the SCA option is ignored. If byte 1 bit 5 is set to B'0', the application program can request autopaged output by setting the SCA value to B'1'. This request is honored only if present in the first segment of the first LPAGE of the output message.

If a nonzero value is specified for byte 0, or for bit 6 or 7 in byte 1, MFS overrides the specified value with zero.

features: MFSFeatureType

FEAT attribute

Specifies features for this device or program group.

IGNORE

Specifies that device features are to be ignored for this device.

120|126|132

Specifies line length for 3284, and 3286 device types (TYPE=3270P).

CARD

Specifies that the device has a 3270 operator identification card reader.

NOCD specifies the absence of the CARD feature.

DEKYBD

Specifies data entry keyboard feature. This feature implies PFK feature; therefore, PFK is invalid if DEKYBD is specified. NOPFK implies the absence of PFK and DEKYBD features.

PFK

Specifies that the device has program function keys. NOPFK specifies the absence of the PFK and DEKYBD features.

PEN

Specifies the selector light pen detect feature. NOPEN specifies the absence of the PEN feature.

1|2|3|4|5|6|7|8|9|10

Specifies customer-defined features for the 3270P device type.

For 3270P devices, FEAT= allows grouping of devices with special device characteristics. For example, FEAT=1 could group devices with a maximum of 80 print positions and no VFC, and FEAT=2 could group devices with 132 print positions and the VFC feature. FEAT=IGNORE should be specified to group together devices with a minimum set of device capabilities. When WIDTH= is specified, FEAT=(1 . . . 10) must also be specified. If FEAT=(1 . . . 10) is specified but WIDTH= is not specified, WIDTH= defaults to 120.

When IGNORE is specified, no other values should be coded in the FEAT= operand. When FEAT=IGNORE is not specified in the TERMINAL macro during system definition, the MSG statement must specify IGNORE in the SOR= operand for the device format with the IGNORE specification. Unless FEAT=IGNORE is used, FEAT= must specify exactly what was specified in the TERMINAL macro during IMS system definition. If it does not, the DFS057 error message is issued. When FEAT=IGNORE or 1–10 is specified for 3270 devices, the operands PEN=, CARD=, and PFK= can still be specified. When TYPE=3270P and FEAT=IGNORE, MFS allows a line width of 120 characters.

CARD, PFK, DEKYBD, and PEN feature values are valid only for 3270 displays. If the FEAT= operand is omitted, the default features are CARD, PFK, and PEN for 3270 displays; the default line width is 120 for TYPE=3270P.

1, 2, 3, 4, 5, 6, 7, 8, 9, and 10 are valid values only for 3270, 3270P and 3270-An. For 3270 displays, the FEAT= specifications of 1 to 5 can be used to group devices with specific features or hardware data stream dependencies.

Restriction: This keyword is optional and cannot be used with any other feature specification for 3270 displays.

Feature operand values can be specified in any order, and only those values desired need be specified. The underlined values do not have to be specified because they are defaults. Only one value in each vertical list can be specified.

page: MFSPageType

PAGE attribute

Specifies output parameters as follows:

number

For printer devices, number defines the number of print lines on a printed page; for card devices, number defines the number of cards to be punched per DPAGE or physical page (if pp parameter is used in the DFLD statements). This value is used for validity checking. The number specified must be greater than or equal to 1 and less than 256. The default is 55.

DEFN

Specifies that lines/cards are to be printed/punched as defined by DFLD statements (no lines/cards are to be removed or added to the output page).

SPACE

Specifies that each output page contains the exact number of lines/cards specified in the number parameter.

FLOAT

Specifies that lines/cards with no data (all blank or NULL) after formatting are to be deleted.

For 3270P devices, some lines having no data (that is, all blank or null) must not be deleted under the following circumstances:

The line contains one or more set line density (SLDx=) specifications.

A field specified as having extended attributes spans more than one line.

pen: String

PEN attribute

Defines an input field name to contain literal data when an immediate light pen detection of a field with a space or null designator character occurs. The literal data is defined on the DFLD statement with the PEN= operand. (See PEN= operand on the DFLD statement.) This name can be referred to by an MFLD statement and must not be used as the label of a DFLD statement within this DEV definition. The PEN= operand is valid only for 3270 displays. If FEAT=NOPEN is specified, it is changed to PEN.

If an immediate detect occurs on a field defined with a space or null designator character, and either another field has been selected or modified or has the MOD attribute, or the PEN= operand is not defined for the DFLD, a question mark (?) is inserted in the PEN= field name.

If no immediate detection occurs or the immediate detect occurs on a field defined with an ampersand (&) designator character, the PEN= operand is padded with the fill specified in the MFLD statement.

pfk: MFSFunctionKeyType

PFK attribute

Defines an input field name to contain program function key literal or control function data (first subparameter) and, in positional or keyword format, either the literal data to be placed in the specified field, or the control function to be performed when the corresponding function key is entered (remaining subparameters).

The name of the first subparameter (the input field name that will contain the program function key literal or control function data) can be referred to by an MFLD statement and must not be used as the label of a DFLD statement within this DEV definition. The remaining subparameters can be specified in positional or keyword format. If the subparameters are in keyword format, the integer specified must be from 1 to 36, inclusive, and not duplicated. Only one PFK= operand format (positional or keyword) can be specified on a DEV statement. This operand is valid only for 3270 displays. At the time the actual format blocks are created, each literal is padded on the right with blanks to the length of the largest literal in the list. The maximum literal length is 256 bytes.

If the device supports the IMS copy function, then PFK12 invokes the copy function and the definition of PFK12 in the DEV statement is ignored; otherwise, the definition of PFK12 is honored.

If FEAT=NOPFK is specified, it is changed to PFK. The maximum number of user-defined PFKs is 36.

Control functions that can be specified are:

NEXTPP—PAGE ADVANCE

Specifies a request for the next physical page in the current output message. If no output message is in progress, no explicit response is made.

NEXTMSG—MESSAGE ADVANCE

Specifies a request to dequeue the output message in progress (if any) and to send the next output message in the queue (if any).

NEXTMSGP—MESSAGE ADVANCE PROTECT

Specifies a request to dequeue the output message in progress (if any), and send the next output message or return an information message indicating that no next message exists.

NEXTLP—NEXT LOGICAL PAGE

Specifies a request for the next logical page of the current message.

ENDMPPI—END MULTIPLE PAGE INPUT

Specifies the end of a multiple physical page input message.

substitution: String

SUB attribute

Specifies the character used by MFS to replace any X'3F' characters in the input data stream. No translation occurs if this parameter is specified as X'3F' or this parameter is not specified, or the input received bypasses MFS editing. The specified SUB character should not appear elsewhere in the data stream; therefore, it should be nongraphic.

X'hh'

Character whose hexadecimal representation is 'hh' replaces all X'3F' in the input data stream.

C'c'

Character 'c' replaces all X'3F' in the input data stream.

type: String

TYPE attribute

Specifies the device type and model number of a device using this format description. The 3284-3 printer attached to a 3275 is supported only as TYPE=3270P.

The model number specified when defining a format for a 3284-3 is the model number of the associated 3275.

TYPE=3270-An specifies a symbolic name for 3270 and SLU 2 displays with the screen size defined during IMS system definition, feature numbers n=1–15. This specification causes the MFS Language utility to read the MFS device characteristics table (DFSUDT0x) to extract the screen size.

width: int

WIDTH attribute

Specifies the maximum line width for this DEV type as one of:

Number of print positions per line of input or output data

Number of punch positions per card of input or output data

Card width for card reader input data

The default is 120 for 3270P output. Line width is specified relative to column 1, regardless of whether a left margin value is specified in the HTAB= keyword. The width specified must be greater than or equal to 1.

For 3270P devices, if WIDTH is specified, then FEAT=(1 . . . 10) must also be specified. If FEAT=(1 . . . 10) is specified, and WIDTH= is not specified, WIDTH= defaults to 120.

MFSMessageDescriptor

MSG statement

The MSG statement initiates and names a message input or output definition.

Unsupported attributes:

All attributes are supported

Derived from MFSStatement

Private Attributes:

fill: String

FILL attribute

Specifies a fill character for output device fields. This operand is valid only if TYPE=OUTPUT. The default is C' '. The fill specification is ignored unless FILL=NONE is specified on the DPAGE statement in the FMT definition. For 3270 output when EGCS fields are present, only FILL=PT or FILL=NULL should be specified. A FILL=PT erases an output field (either a 1- or 2-byte field) only when data is sent to the field, and thus does not erase the DFLD if the application program message omits the MFLD.

C'c'

Character 'c' is used to fill device fields. For 3270 display devices, any specification with a value less than X'3F' is changed to X'00' for control characters or to X'40' for other nongraphic characters. For all other devices, any FILL=C'c' specification with a value less than X'3F' is ignored and defaulted to X'3F' (which is equivalent to a specification of FILL=NULL).

NULL

Specifies that fields are not to be filled.

PT

Is identical to NULL except for 3270 display. For 3270 display, PT specifies that output fields that do not fill the device field (DFLD) are followed by a program tab character to erase data previously in the field.

ignoreSource: boolean

SOR attribute

Specifies the source name of the FMT statement which, with the DEV statement, defines the terminal or remote program data fields processed by this message descriptor. Specifying IGNORE for TYPE=OUTPUT causes MFS to use data fields specified for the device whose FEAT= operand specifies IGNORE in the device format definition. For TYPE=INPUT, IGNORE should be specified only if the corresponding message output descriptor specified IGNORE. If you use SOR=IGNORE, you must specify IGNORE on both the message input descriptor and the message output descriptor.

option: int

OPT attribute

Specifies the message formatting option used by MFS to edit messages. The default is 1.

paging: boolean

PAGE attribute

Specifies whether (YES) or not (NO) operator logical paging (forward and backward paging) is to be provided for messages edited using this control block. This operand is valid only if TYPE=OUTPUT. The default is NO, which means that only forward paging of physical pages is provided.

type: MFSDescriptorType

TYPE attribute

Defines this definition as a message INPUT or OUTPUT control block. The default is INPUT.

MFSLogicalPage

LPAGE statement

The optional LPAGE statement defines a group of segments comprising a logical page. It is implied if not present.

Unsupported attributes:
    All attributes are supported
Derived from MFSStatement
Private Attributes:
condition: MFSConditionType COND attribute Describes a conditional test that, if successful, specifies that the segment and field definitions following this LPAGE are to be used for output editing of this logical page. The specified portion of the first segment of a logical page is examined to determine if it is greater than (>), less than (<), greater than or equal to (°), less than or equal to (°), equal to (=), or not equal to (ne) the specified literal value to determine if this LPAGE is to be used for editing. COND= is not required for the last LPAGE statement in the MSG definition.

The area examined can be defined by a field name (mfldname), an offset in a field (mfldname(pp) where pp is the offset in the named field), or an offset in the segment (segoffset). If the mfldname(pp) form is used, pp must be greater than or equal to 1. The length of the compare is the length of the specified literal. If OPT=3 is specified on the previous MSG statement, the area to be examined must be within one field as defined on an MFLD statement.

If segoffset is used, it is relative to zero, and the specification of that offset must allow for LLZZ of the segment (that is, the first data byte is at offset 4).

If pp is used, the offset is relative to 1 with respect to the named field (that is, the first byte of data in the field is at offset 1, not zero).

If the mfldname specified is defined with ATTR=YES, the pp offset must be used. The minimum offset specified must be 3. That is, the first byte of data in the field is at offset 3, following the two bytes of attributes.

If ATTR=nn is specified, the minimum offset must be one plus twice nn. Thus, if ATTR=2 is specified, pp must be at least 5, and, if ATTR=(YES,2) is specified, pp must be at least 7.

If the conditional tests for all LPAGEs fail, the last LPAGE in this MSG definition is used for editing.

If LPAGE selection is to be specified using the command data field, that is, /FORMAT modname . . . (data), the MFLD specified in the LPAGE COND=mfldname parameter should be within the first 8 bytes of the associated LPAGEs of the MOD.

promptValue: String

MFSSegment

SEG statement

The SEG statement delineates message segments and is required only if multisegment message processing is required by the application program. Output message segments cannot exceed your specified queue buffer length. Only one segment should be defined for TYPE=INPUT MSGs when the input message destination is defined as a single segment command or transaction. If more than one segment is defined, and the definition is used to input a single segment command or transaction, care must be used to ensure that your input produces only one segment after editing. It is implied if not present.

Unsupported attributes:
    All attributes are supported
Derived from MFSStatement
Private Attributes:
exit: MFSExitType EXIT attribute Describes the segment edit exit routine interface for this message segment. exitnum is the exit routine number and exitvect is a value to be passed to the exit routine when it is invoked for this segment. exitnum can range from 0 to 127. exitvect can range from 0 to 255. The SEG exit is invoked when processing completes for the input segment.

graphic: boolean

GRAPHIC attribute

Specifies for MSG TYPE=INPUT whether (YES) or not (NO) IMS should perform upper case translation on this segment if the destination definition requests it (see the EDIT= parameter of the TRANSACT or NAME macro). The default is YES. If input segment data is in nongraphic format (packed decimal, EGCS, binary, and so forth), GRAPHIC=NO should be specified. When GRAPHIC=NO is specified, FILL=NULL is invalid for MFLDs within this segment.

The list below shows the translation that occurs when GRAPHIC=YES is specified and the input message destination is defined as requesting upper case translation:

Before Translation   After Translation
a through z
    A through Z
X'81' through X'89'
    X'C1' through X'C9'
X'91' through X'99'
    X'D1' through X'D9'
X'A2' through X'A9'

X'E2' through X'E9'

If FILL=NULL is specified for any MFLD in a segment defined as GRAPHIC=YES, the hexadecimal character X'3F' is compressed out of the segment. If GRAPHIC=NO and FILL=NULL are specified in the SEG statement, any X'3F' in the non-graphic data stream is compressed out of the segment and undesirable results might be produced. Non-graphic data should be sent on output as fixed length output fields and the use of FILL=NULL is not recommended in this case.

For MSG TYPE=OUTPUT, the GRAPHIC= keyword applies only for DPM. It specifies whether (YES) or not (NO) nongraphic control characters (X'00' to X'3F') in the data from the IMS application program are to be replaced by blanks. The default value is YES. If NO is specified, MFS allows any bit string received from an IMS application program to flow unmodified through MFS to the remote program.

Restriction: When GRAPHIC=NO is specified, IMS application programs using Options 1 and 2 cannot omit segments in the middle of an LPAGE, or truncate or omit fields in the segment using the null character (X'3F').

MFSMessageField

MFLD statement

The MFLD statement defines a message field as it will be presented to an application program as part of a message output segment. At least one MFLD statement must be specified for each MSG definition.

Unsupported attributes:
All attributes are supported
Derived from MFSStatement
Private Attributes:
attributes: boolean ATTR attribute Specifies whether (YES) or not (NO) the application program can modify the 3270 attributes and the extended attributes (nn).

If YES, 2 bytes must be reserved for the 3270 attribute data to be filled in by the application program on output and to be initialized to blanks on input. These 2 bytes must be included in the LTH= specification.

The value supplied for nn is the number of extended attributes that can be dynamically modified. The value of nn can be a number from 1 to 6. An invalid specification will default to 1. Two additional bytes per attribute must be reserved for the extended attribute data to be filled in by the application program on output and to be initialized to blanks on input. These attribute bytes must be included in the MFLD LTH= specification.

Example: Shown below are valid specifications for ATTR= and the number of bytes that must be reserved for each different specification:

MFLD ,ATTR=(YES,nn)
  2+(2×nn)

MFLD ,ATTR=(NO,nn)
  2×nn

MFLD ,ATTR=(nn)
  2×nn

MFLD ,ATTR=YES
  2

MFLD ,ATTR=NO
  0

ATTR=YES and nn are invalid if a literal value has been specified through the positional parameter in an output message.

The attributes in a field sent to another IMS ISC subsystem are treated as input data by MFS regardless of any ATTR= specifications in the format of the receiving subsystem. For example, a message field (MFLD) defined as ATTR=(YES,1),LTH=5 would contain the following:
00A0C2F1C8C5D3D3D6

If the MFLD in the receiving subsystem is defined as LTH=9 and without ATTR=, the application program receives:
00A0C2F1C8C5D3D3D6

If the MFLD in the receiving subsystem is defined as LTH=13 and ATTR=(YES,1), the application program receives:
4040404000A0C2F1C8C5D3D3D6

If the MFLD in the receiving subsystem is defined as LTH=5 and ATTR=(YES,1), the application program receives:
4040404000A0C2F1C8

The input SEG statement should be specified as GRAPHIC=NO to prevent translation of the attribute data to uppercase.

exit: MFSExitType

EXIT attribute

Describes the field edit exit routine interface for this message field. The exit routine number is specified in exitnum, and exitvect is a value to be passed to the exit routine when it is invoked for this field. The value of exitnum can range from 0 to 127. The value of exitvect can range from 0 to 255. The address of the field as it exists after MFS editing, (but before NULL compression for option 1 and 2), is passed to the edit exit routine, along with the vector defined for the field. (If NOFLDEXIT is specified for a DPM device, the exit routine will not be invoked.) The exit routine can return a code with a value from 0 to 255. MFS maintains the highest such code returned for each segment for use by the segment edit routine. EXIT= is invalid if 'literal' is specified on the same MFLD statement.

extendedAttributes: int

ATTR attribute

Specifies whether (YES) or not (NO) the application program can modify the 3270 attributes and the extended attributes (nn).

If YES, 2 bytes must be reserved for the 3270 attribute data to be filled in by the application program on output and to be initialized to blanks on input. These 2 bytes must be included in the LTH= specification.

The value supplied for nn is the number of extended attributes that can be dynamically modified. The value of nn can be a number from 1 to 6. An invalid specification will default to 1. Two additional bytes per attribute must be reserved for the extended attribute data to be filled in by the application program on output and to be initialized to blanks on input. These attribute bytes must be included in the MFLD LTH= specification.

Example: Shown below are valid specifications for ATTR= and the number of bytes that must be reserved for each different specification:

MFLD ,ATTR=(YES,nn)
  2+(2×nn)

MFLD ,ATTR=(NO,nn)
  2×nn
MFLD ,ATTR=(nn)
  2×nn
MFLD ,ATTR=YES
  2
MFLD ,ATTR=NO
  0
ATTR=YES and nn are invalid if a literal value has been specified through the positional parameter in an output message.
The attributes in a field sent to another IMS ISC subsystem are treated as input data by MFS regardless of any ATTR= specifications in the format of the receiving subsystem. For example, a message field (MFLD) defined as ATTR=(YES,1),LTH=5 would contain the following:
  00A0C2F1C8C5D3D3D6
If the MFLD in the receiving subsystem is defined as LTH=9 and without ATTR=, the application program receives:
  00A0C2F1C8C5D3D3D6
If the MFLD in the receiving subsystem is defined as LTH=13 and ATTR=(YES,1), the application program receives:
  4040404000A0C2F1C8C5D3D3D6
If the MFLD in the receiving subsystem is defined as LTH=5 and ATTR=(YES,1), the application program receives:
  4040404000A0C2F1C8
The input SEG statement should be specified as GRAPHIC=NO to prevent translation of the attribute data to uppercase.

fill: String
  FILL attribute
  Specifies a character to be used to pad this field when the length of the data received from the device is less than the length of this field. This character is also used to pad when no data is received for this field (except when MSG statement specifies option 3.) This operand is only valid if TYPE=INPUT. The default is X'40'.
  X'hh'
  Character whose hexadecimal representation is hh is used to fill fields.
  FILL=X'3F' is the same as FILL=NULL.
  C'c'
  Character c is used to fill fields.
  NULL
  Causes compression of the message segment to the left by the amount of missing data in the field.

justify: MFSJustifyType
  JUST attribute
  Specifies that the data field is to be left-justified (L) or right-justified (R) and right- or left-truncated as required, depending upon the amount of data expected or presented by the device format control block. The default is L.

length: MFSLengthType
  LTH attribute
  Can be omitted if a literal is specified in the positional operand (TYPE=INPUT), in which case, length specified for literal is used. If LTH= is specified for a literal field, the specified literal is either truncated or padded with blanks to the specified length. If the MFLD statement appears between a DO and an ENDDO statement, a length value is printed on the generated MFLD statement, regardless of whether LTH= is specified in the MFLD source statement.

value: String
  value attribute
  This corresponds to the 'literal' field in the following description.
  The device field name is specified via the 'deviceFields' relationship.
  Specifies the device field name (defined via the DEV or DFLD statement) from which input data is extracted or into which output data is placed. If this parameter is omitted when defining a message output control block, the data supplied by the application program is not displayed on the output device. If the repetitive generation function of MFS is used (DO and ENDDO statements), dfldname should be restricted to 6 characters maximum length. When each repetition of the statement is generated, a 2-character sequence number (01 to 99) is appended to dfldname. If the dfldname specified here is greater than 6 bytes and repetitive generation is used, dfldname is truncated at 6 characters and a 2-character sequence number is appended to form an 8-character name. No error message is provided if this occurs. This parameter can be specified in one of the following formats:
  dfldname
  Identifies the device field name from which input data is extracted or into which output data is placed.
  'literal'
  Can be specified if a literal value is to be inserted in an input message.
  (dfldname, 'literal')
  If TYPE=OUTPUT, this describes the literal data to be placed in the named DFLD. When this form is specified, space for the literal must not be allocated in the output message segment supplied by the application program.
  If TYPE=INPUT, this describes the literal data to be placed in the message field when no data for this field is received from the device. If this dfldname is used in the PFK parameter of a DEV statement, this literal is always replaced by the PF key literal or control function. However, when this dfldname is specified in the PFK parameter, but the PF key is not used, the literal specified in the MFLD statement is moved into the message field. When physical paging is used, the literal is inserted in the field but is not processed until after the last physical page of the logical page has been displayed.
  In both cases, if the LTH= operand is specified, the length of the literal is truncated or padded as necessary to the length of the LTH= specification. If the length of the specified literal is less than the defined field length, the literal is padded with blanks if TYPE=OUTPUT and with the specified fill character (FILL=) if TYPE=INPUT. If no fill character is specified for input, the literal is padded with blanks (the default). The length of the literal value cannot exceed 256 bytes.
  (dfldname,system-literal)
  Specifies a name from a list of system literals. A system literal functions like a normal literal except that the literal value is created during formatting prior to transmission to the device. The LTH=, ATTR=, and JUST= operands cannot be specified. When this form is specified, space for the literal must not be allocated in the output message segment supplied by the application program.

(,SCA)

Defines this output field as the system control area which is not displayed on the output device. There can be only one such field in a logical page (LPAGE) and it must be in the first message segment of that page. If no logical pages are defined, only one SCA field can be defined and it must be in the first segment of the output message. This specification is valid only if TYPE=OUTPUT was specified on the previous MSG statement.

MFSDevicePage

DPAGE statement

The DPAGE statement defines a logical page of a device format. This statement can be omitted if none of the message descriptors referring to this device format (FMT) contains LPAGE statements and if no specific device option is required. It is implied if not present.

Unsupported attributes:
ACTVPID
COND
OFTAB
ORIGIN
PD
SELECT

Derived from MFSStatement

Private Attributes:

cursor: MFSCursorType

CURSOR attribute

Specifies the position of the cursor on a physical page. Multiple cursor positions may be required if a logical page or message consists of multiple physical pages. The value lll specifies line number, ccc specifies column; both lll and ccc must be greater than or equal to 1. The cursor position must either be on a defined field or defaulted. The default lll,ccc value for 3270 displays is 1,2. For Finance display components, if no cursor position is specified, MFS will not position the cursor—the cursor is normally placed at the end of the output data on the device. For Finance display components, all cursor positioning is absolute, regardless of the ORIGIN= parameter specified.

The dfld parameter provides a method for supplying the application program with cursor information on input and allowing the application program to specify cursor position on output.

Recommendation: Use the cursor attribute facility (specify ATTR=YES in the MFLD statement) for output cursor positioning.

The dfld parameter specifies the name of a field containing the cursor position. This name may be referenced by an MFLD statement and must not be used as the label of a DFLD statement in this DEV definition. The format of this field is two binary halfwords containing line and column number, respectively. When this field is referred to by a message input descriptor, it will contain the cursor position at message entry. If referred to by a message output descriptor, the application program places the desired cursor position into this field as two binary halfwords containing line and column, respectively. Binary zeros in the named field cause the specified lll,ccc to be used for cursor positioning during output. During input, binary zeros in this field indicate that the cursor position is not defined. The input MFLD referring to this dfld should be defined within a segment with GRAPHIC=NO specified or should use EXIT=(0,2) to convert the binary numbers to decimal.

fill: String

FILL attribute

Specifies a fill character for output device fields. Default value for all device types except the 3270 display is X'40'; default for the 3270 display is PT. For 3270 output when EGCS fields are present, only FILL=PT or FILL=NULL should be specified. A FILL=PT erases an output field (either a 1- or 2-byte field) only when data is sent to the field, and thus does not erase the DFLD if the application program message omits the MFLD.

NONE

Must be specified if the fill character from the message output descriptor is to be used to fill the device fields.

X'hh'

Character whose hexadecimal representation is 'hh' will be used to fill the device fields.

C'c'

Character 'c' will be used to fill the device fields.

NULL

Specifies that fields are not to be filled. For devices other than the 3270 display, 'compacted lines' are produced when message data does not fill the device fields.

PT

Specifies that output fields that do not fill the device field (DFLD) are followed by a program tab character to erase data previously in the field; otherwise, this operation is identical to FILL=NULL.

For 3270 display devices, any specification with a value less than X'3F' is changed to X'00' for control characters or to X'40' for other nongraphic characters.

multiplePages: boolean

MULT attribute

Specifies that multiple physical page input messages will be allowed for this DPAGE.

MFSDeviceField

DFLD statement

The DFLD statement defines a field within a device format which is read from or written to a terminal or remote program. Only those areas which are of interest to the IMS or remote application program should be defined. Null space in the format does not need to be defined.

Unsupported attributes:
SLD

Derived from MFSStatement

Private Attributes:

attributes: MFSAttributeType

ATTR attribute extendedAttributes: MFSExtendedAttributeType

EATTR attribute length: int

LTH attribute

Specifies the length of the field. This operand should be omitted if 'literal' is specified in the positional parameter, in which case the length of literal is used as the field length. Unpredictable output formatting can occur if this operand is used in conjunction with a 'literal' and the two lengths are different. The specified LTH= cannot exceed the physical page size of the device.

The maximum allowable length for all devices except 3270, 3604 display, and DPM with RCDCT=NOSPAN is 8000 characters. For 3270 displays, the maximum length is one less than screen size. For example, for a 480-character display, the maximum length is 479 characters. A length of 0 must not be specified. If SCA and LTH= are both specified, LTH must be 2.

POS= and LTH= do not include the attribute character position reserved for a 3270 display device or a DFLD with ATTR=YES specified. The inclusion of this byte in the design of display/printer formats is necessary because it occupies the screen/printed page position preceding each displayed/printed field even though it is not accessible by an application program.

When defining DFLDs for 3270 printers, a hardware ATTRIBUTE character is not used. Therefore, fields must be defined with a juxtaposition that does not allow for the attribute character unless ATTR=YES is specified. However, for printers defined as 3270P the last column of a print line (based on FEAT=, WIDTH=, or the device default width) cannot be used. The last column of the line is reserved for carriage control operations performed by IMS. Thus, if the print line specifies 120 (FEAT=120) and the DFLD specifies POS=(1,1),LTH=120 then 119 characters are printed on line 1 and one character on line 2.

Detectable fields (DET or IDET) must include four positions in POS and LTH for a 1-byte detection designator character and 3 pad characters, unless the detectable field is the last field on a display line, in which case only one position for the detection designator character is required. The detection designator character must precede field data, and pad characters (if required) follow field data. Detection designator and required pad characters must be supplied by the application program or MFLD literal with the field data. Pad characters can also be required in the preceding field on the device.

pen: String
 PEN attribute
 Specifies a literal to be selected or an operator control function to be performed when this field is detected. If (1) 'literal' is specified, (2) the field is defined as immediately detectable (ATTR= operand), and (3) contains the null or space designator character, the specified literal is placed in the field referred to by the PEN operand of the preceding DEV statement when the field is detected (if no other device fields are modified). If another field on the device is modified, a question mark (?) is provided instead of the literal. Literal length must not exceed 256 bytes.
 If (1) a control function is specified, (2) the field is defined as immediately detectable (ATTR= operand), and (3) contains the null or space designator character, the specified control function is performed when the field is detected and no other device fields are modified. If another field on the device is modified, a question mark (?) is provided and the function is not performed. Control functions that can be specified are:
 NEXTPP—PAGE ADVANCE
 Specifies a request for the next physical page in the current output message. If no output message is in progress, no explicit response is made.
 NEXTMSG—MESSAGE ADVANCE
 specifies a request to dequeue the output message in progress (if any) and to send the next output message in the queue (if any).
 NEXTMSGP—MESSAGE ADVANCE PROTECT
 Specifies a request to dequeue the output message in progress (if any), and send the next output message or return an information message indicating that no next message exists.
 NEXTLP—NEXT LOGICAL PAGE
 Specifies a request for the next logical page of the current message.
 ENDMPPI—END MULTIPLE PAGE INPUT
 Specifies the end of a multiple physical page input message.
 ENDMPPI is valid only if data has been received and will not terminate multiple page input (MPPI) in the absence of data entry.

position: MFSPositionType
 POS attribute
 Defines the first data position of this field in terms of line (lll), column (ccc), and physical page (pp) of the display format. If pp is omitted, 1 is assumed.
 For DEV TYPE=3270, 3270-An, or 3270P
 lll,ccc,pp
 Specifies the line, column, and optionally, the physical page number for an output field. lll, ccc, and pp must be greater than or equal to 1.
 For 3270 displays, POS=(1,1) must not be specified. Fields must not be defined such that they wrap from the bottom to the top.
 Restriction: On some models of 3270s, the display screen cannot be copied when a field starting on line 1, column 2, has both alphabetic and protect attributes.

value: String
MFSTable
 TABLE statement
 The TABLE statement initiates and names an operator control table that can be referred to by the OPCTL keyword of the DFLD statement. The TABLE statement, and the IF and TABLEEND statements that follow, must be outside of a MSG or FMT definition.
 Unsupported attributes:
  All attributes are supported
 Derived from MFSStatement
MFSDeviceDivision
 DIV statement
 The DIV statement defines device formats within a DIF or DOF. The formats are identified as input, output, or both input and output, and can consist of multiple physical pages. Only one DIV statement per DEV is allowed.
 Unsupported attributes:
  RCDCTL
  HDRCTL
  OPTIONS
  OFTAB
  DPN
  PRN
  RDPN
  RPRN
 Derived from MFSStatement
 Private Attributes:

type: MFSDescriptorType
  TYPE attribute
  Describes an input only format (INPUT), an output only format (OUTPUT), or both (INOUT).
  If DIV TYPE=OUTPUT or TYPE=INPUT is specified, certain DEV statement keywords are applicable.
compression: MFSCompressionType
  COMPR attribute
  Requests MFS to remove trailing blanks from short fields, fixed-length fields, or all fields presented by the application program.
MFSIfCondition
  IF statement
  The IF statement defines an entry in the table named by the previous TABLE statement. Each IF statement defines a conditional operation and an associated control or branching function to be performed if the condition is true.
  Unsupported attributes:
    All attributes are supported
  Derived from MFSStatement
  Private Attributes:
  condition: MFSConditionType
    condition attribute
    Condition has the following format:
    IF (DATA|LENGTH) (=,<,>,¬,°,°) (literal|data-length) function
    DATA
    Specifies that the conditional operation is to be performed against the data received from the device for the field.
    LENGTH
    Specifies that the conditional operation is testing the number of characters entered for the field. The size limit for this field is the same as for DFLDs (see "DFLD Statement" in topic 2.5.1.5.8).
    =,<,>,¬,°,°
    Specify the conditional relationship that must be true to invoke the specified control function.
    'literal'
    Is a literal string to which input data is to be compared. The compare is done before the input is translated to upper case. If 'literal' is specified, DATA must be specified in the first operand. If the input data length is not equal to the literal string length, the compare is performed with the smaller length, unless the conditional relationship is ¬ and the data length is zero, in which case the control function is performed. If the input is in lowercase, the ALPHA statement should be used and the literal coded in lowercase.
    data-length
    Specifies an integer value to which the number of characters of input data for the field is compared.
    NOFUNC
    Specifies that conditional function testing is to be terminated.
    NEXTPP—PAGE ADVANCE
    Specifies a request for the next physical page in the current output message. If no output message is in progress, no explicit response is made.
    NEXTMSG—MESSAGE ADVANCE
    Specifies a request to dequeue the output message in progress (if any) and to send the next output message in the queue (if any).
    NEXTMSGP—MESSAGE ADVANCE PROTECT
    Specifies a request to dequeue the output message in progress (if any), and either send the next output message or return an information message indicating that no next message exists.
    NEXTLP—NEXT LOGICAL PAGE
    Specifies a request for the next logical page of the current message.
    PAGEREQ—LOGICAL PAGE REQUEST
    Specifies that the second through last characters of input data are to be considered as a logical page request.
    ENDMPPI—END MULTIPLE PAGE INPUT
    Specifies the end of multiple physical page input (this input is the last for the message being created).
  action: String
MFSPassword
  PASSWORD statement
  The PASSWORD statement identifies one or more fields to be used as an IMS password. When used, the PASSWORD statement and its associated MFLDs must precede the first SEG statement in an input LPAGE or MSG definition. Up to 8 MFLD statements can be specified after the PASSWORD statement but the total password length must not exceed 8 characters. The fill character must be X'40'. For option 1 and 2 messages, the first 8 characters of data after editing are used for the IMS password. For option 3 messages, the data content of the first field after editing is used for the IMS password.
  A password for 3270 input can also be defined in a DFLD statement. If both password methods are used, the password specified in the MSG definition is used.
  Unsupported attributes:
    All attributes are supported
  Derived from MFSStatement
MFSDeviceDescriptor
  FMT statement
  The FMT statement initiates and names a format definition that includes one or more device formats differing only in the device type and features specified in the DEV statement. Each device format included in the format definition specifies the layout for data sent to or received from a device or a remote program.
  Unsupported attributes:
    All attributes are supported
  Derived from MFSStatement
MFSFunctionKeyType
  Private Attributes:
  fieldName: String
MFSFunctionKeyValueType
  Private Attributes:
  index: int
  function: String
MFSFormatLibrary
  This class is designed to duplicate the effects of a FORMATLIB. In other words, it acts as a central point around which MFS sources files are grouped.
  This class was introduced to address the problem of MSG and LPAGE statements referring to MSG statements in other source files. Rather to force the user to parse every source file in a given formatlib at once, this class was added to act as a container to MSG pointers. Please see MFSMessagePointer documentation for more information.

Private Attributes:
name: String
MFSMessagePointer
  This class is designed to act as a placeholder for MSG statements. Rather than point to actual MSG statements from the NXT attribute (nextMessage relationship), MSG and LPAGE statements will point to an instance of this class.
  A new instance of this class will be created when a MSG or LPAGE statement points to a MSG statement that is not represented in this particular FORMATLIB. A new instance will also be created when an MSG statement is parsed, if that statement is not already represented here.
Private Attributes:
name: String
TOTALS:
1 Logical Packages
16 Classes
LOGICAL PACKAGE STRUCTURE
Logical View
  mfs While the invention has been described with respect to certain preferred embodiments and exemplifications, it is not intended to limit the scope of the invention thereby, but solely by the claims appended hereto.

We claim:

1. A method of processing an application request on an end user application and an application server including a transaction message formatter, said method comprising:
  a) initiating the application request on the end user application in a first language with a first application program;
  b) transmitting the application request to the application server and converting the application request from the first language of the first end user application to a second language of a form for the transaction message formatter running on the application server;
  c) processing said application request on the application server;
  d) transmitting a response to the application request from the application server to the end user application, and converting the response to the application request from the second language of the transaction message formatter running on the application server to the first language of the first end user application; and
  e) wherein the end user application and the application server have at least one connector therebetween, and the steps of (i) converting the application request from the first language of the first end user application as a source language to the second language running on the application server as a target language, and (ii) converting the response to the application request from second the language running on the application server as a source language to the first language of the first end user application as a target language, each comprise the steps of:
    1) invoking connector metamodels of respective source and target languages;
    2) populating the connector metamodels with metamodel data of each of the respective source and target languages; and
    3) converting the source language to target language.

2. The method of claim 1 wherein the end user application is a web browser.

3. The method of claim 2 wherein the end user application is connected to the application server through a web server, and the web server comprises a connector.

4. The method of claim 1 wherein the metamodel comprises invocation metamodel data, application domain interface metamodel data, transaction message metamodel data, and type descriptor metamodel data.

5. The method of claim 1, further comprising populating the connector metamodels with metamodel data of the transaction message formatter, a message descriptor, logical page, password, segment, message field, device descriptor, device type, device division, device page and device field.

6. A transaction processing system comprising a client, a server, and at least one connector therebetween,
  a) the client having an end user application, and being controlled and configured to initiate an application request with the server in a first language with a first application program and to transmit the application request to the server;
  b) the connector being configured and controlled to receive the application request from the client, convert the application request from the first language of the first end user application running on the client to a second language of a form for a transaction message formatter running on the server;
  c) the server being configured and controlled to receive the converted application request from the connector and processing the said application request in the second language with a second application program residing on the server, and to thereafter transmit a response to the application request through the connector back to the first application program on the client;
  d) the connector being configured and controlled to receive the response to the application request from the server, to convert the response to the application request from the second language running on the server to the first language of the first application program running on the client; and
  e) wherein connector between the client and the server is configured and controlled to (i) convert the application request from the first language of the client application on the client as a source language to the second language running on the server as a target language, and (ii) convert the response to the application request from the second language running on the server as a source language to the first language of the client application running on the client as a target language, each by a method comprising the steps of:
    1) retrieving connector metamodels of respective source and target languages from a metamodel data repository;
    2) populating the connector metamodels with metamodel data from the metamodel data repository for each of the respective source and target languages; and
    3) invoking the retrieved, populated connector metamodels and converting the source language to the target language.

7. The system of claim 6 wherein the end user application is a web browser.

8. The system of claim 7 wherein the end user application is connected to the application server through a web server, and the web server comprises a connector.

9. The system of claim 6 wherein the metamodel data repository stores transaction message formatter metadata including a message descriptor, logical page, password, segment, message field, device descriptor, device type, device division, device page and device field.

10. A transaction processing system configured and controlled to interact with a client application, and comprising a server, and at least one connector between the server and the client application, wherein:

a) the client has an end user application, and is controlled and configured to initiate an application request with the server in a first language with a first application program and to transmit the application request to the server;

b) the connector being configured and controlled to receive the application request from the client, convert the application request from the first language of the first end user application running on the client to a second language running on the server;

c) the server being configured and controlled to receive the converted application request from the connector and process the application request in the second language with a second application program and a transaction message formatter residing on the server, and to thereafter transmit the response to the application request through the connector back to the first application program on the client;

d) the connector being configured and controlled to receive the response to the application request from the server, to convert the response to the application request from the second language running on the server to the first language of the first application program running on the client; and e) wherein the connector between the client and the server is configured and controlled to (i) convert the application request from the first language of the client application on the client as a source language to the second language running on the server as a target language, and (ii) convert the response to the application request from the second language running on the server as a source language to the first language of the client application running on the client as a target language, each by a method comprising the steps of:

1) retrieving connector metamodel data of respective source and target languages from a metamodel data repository;

2) populating the connector metamodels with metamodel data of each of the respective source and target languages and the transaction message formattter, from the metamodel data repository, and invoking the retrieved, populated connector metamodels; and 3) converting the source language to the target language.

11. The system of claim 10 wherein the end user application is a web browser.

12. The system of claim 11 wherein the end user application is connected to the application server through a web server, and the web server comprises a connector.

13. The system of claim 10 wherein the transaction message formatter metadata includes a message descriptor, logical page, password, segment, message field, device descriptor, device type, device division, device page and device field.

14. A program product comprising a computer-readable storage medium having invocation metamodel data, application domain interface metamodel data, language metamodel data, and transaction message formatter metamodel data; and computer instructions for building a metamodel data repository of source and target language metamodel data, wherein said transaction message formatter metamodel data includes a message descriptor, logical page, password, segment, message field, device descriptor, device type, device division, device page and device field.

15. The program product of claim 14 wherein the metamodel data in the repository comprises invocation metamodel data, application domain interface metamodel data, transaction message formatter metamodel data, and type descriptor metamodel data.

16. The program produce of claim 14 wherein the computer-readable storage medium includes computer instructions for building connector stubs from said metamodel metadata.

* * * * *

UNITED STATES PATENT AND TRADEMARK OFFICE
CERTIFICATE OF CORRECTION

| | | |
|---|---|---|
| PATENT NO. | : 6,948,174 B2 | Page 1 of 2 |
| APPLICATION NO. | : 09/849105 | |
| DATED | : September 20, 2005 | |
| INVENTOR(S) | : Chiang, Chenhuei J. et al. | |

It is certified that error appears in the above-identified patent and that said Letters Patent is hereby corrected as shown below:

In column 35, line 53, "second the" should read --the second--

In column 35, line 62, "to target language" should read --to the target language--

In column 38, line 35, "produce" should read --product--

In column 38, line 18, cancel the text beginning with "14. A program product" and ending with "device fields." in column 38, line 29, and insert the following claim:

--14. A program product comprising a computer-readable storage medium having invocation metamodel data, application domain interface metamodel data, language metamodel data, and transaction message formatter metamodel data;
computer instructions for building a metamodel data repository of source and target language metamodel data; and computer instructions to build a connector for:

1)    retrieving connector metamodel data of respective source and target languages from the metamodel data repository;

2)    populating the connector metamodels with metamodel data of each of the respective source and target languages and the transaction message formatter, from the metamodel data repository, and invoking the retrieved, populated connector metamodels; and

UNITED STATES PATENT AND TRADEMARK OFFICE
CERTIFICATE OF CORRECTION

| | |
|---|---|
| PATENT NO. | : 6,948,174 B2 |
| APPLICATION NO. | : 09/849105 |
| DATED | : September 20, 2005 |
| INVENTOR(S) | : Chiang, Chenhuei J. et al. |

It is certified that error appears in the above-identified patent and that said Letters Patent is hereby corrected as shown below:

3)    converting the source language to the target language,
wherein said transaction message formatter metamodel data includes a message descriptor, logical page, password, segment, message field, device descriptor, device type, device division, device page and device field.--

Signed and Sealed this

Twelfth Day of September, 2006

JON W. DUDAS
*Director of the United States Patent and Trademark Office*